(12) United States Patent
Takao

(10) Patent No.: US 11,993,489 B2
(45) Date of Patent: May 28, 2024

(54) ELEVATOR SYSTEM

(71) Applicant: Mitsubishi Electric Corporation, Tokyo (JP)

(72) Inventor: Akira Takao, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 856 days.

(21) Appl. No.: 17/040,052

(22) PCT Filed: Jul. 17, 2018

(86) PCT No.: PCT/JP2018/026697
§ 371 (c)(1),
(2) Date: Sep. 22, 2020

(87) PCT Pub. No.: WO2020/016925
PCT Pub. Date: Jan. 23, 2020

(65) Prior Publication Data
US 2021/0016993 A1    Jan. 21, 2021

(51) Int. Cl.
*B66B 5/02* (2006.01)
*B66B 1/34* (2006.01)

(52) U.S. Cl.
CPC ............ *B66B 5/028* (2013.01); *B66B 1/3461* (2013.01)

(58) Field of Classification Search
CPC ....... B66B 5/027; B66B 5/028; B66B 1/3461; B66B 17/00; Y02B 50/00; Y02T 10/70
See application file for complete search history.

(56) References Cited

U.S. PATENT DOCUMENTS

| 4,279,563 A | 7/1981 | Miller |
| 2012/0045303 A1* | 2/2012 | Macdonald ............. A47F 10/00 414/373 |

FOREIGN PATENT DOCUMENTS

| CN | 104505916 A | 4/2015 |
| CN | 106130136 A | 11/2016 |
| CN | 107465277 A | 12/2017 |
| CN | 207433310 U | 6/2018 |
| JP | 2002-348055 A | 12/2002 |
| JP | 2009-051617 A | 3/2009 |
| JP | 2013-136445 A | 7/2013 |
| JP | 2015-101448 A | 6/2015 |

(Continued)

OTHER PUBLICATIONS

Chinese Office Action dated Sep. 15, 2022 in corresponding Chinese Patent Application No. 201880094907.5 (with machine-generated English translation), 13 pages.

(Continued)

*Primary Examiner* — Jeffrey M Shin
(74) *Attorney, Agent, or Firm* — XSENSUS LLP

(57) ABSTRACT

Provided is an elevator system which can easily supply power to an elevator. The elevator system includes a coordinating device configured to command an autonomous mobile body which moves inside a building provided with an elevator to supply power to the elevator in a case where the coordinating device determines that a supply of power from the autonomous mobile body to the elevator is necessary. According to the elevator system, the autonomous mobile body supplies power to the elevator when the supply of power to the elevator is necessary. Therefore, power can be easily supplied to the elevator.

18 Claims, 16 Drawing Sheets

(56) References Cited

FOREIGN PATENT DOCUMENTS

JP 6129061 B2 5/2017

OTHER PUBLICATIONS

Office Action dated Aug. 17, 2021, in corresponding Indian patent Application No. 202047038711, 5 pages.
International Search Report and Written Opinion dated Sep. 4, 2018 for PCT/JP2018/026697 filed on Jul. 17, 2018, 8 pages including English Translation of the International Search Report.
Chinese Office Action dated Apr. 20, 2022, in corresponding Chinese Application No. 201880094907.5.
Chinese Office Action dated Feb. 27, 2023, in corresponding Chinese Application No. 201880094907.5.

* cited by examiner

FIG. 9

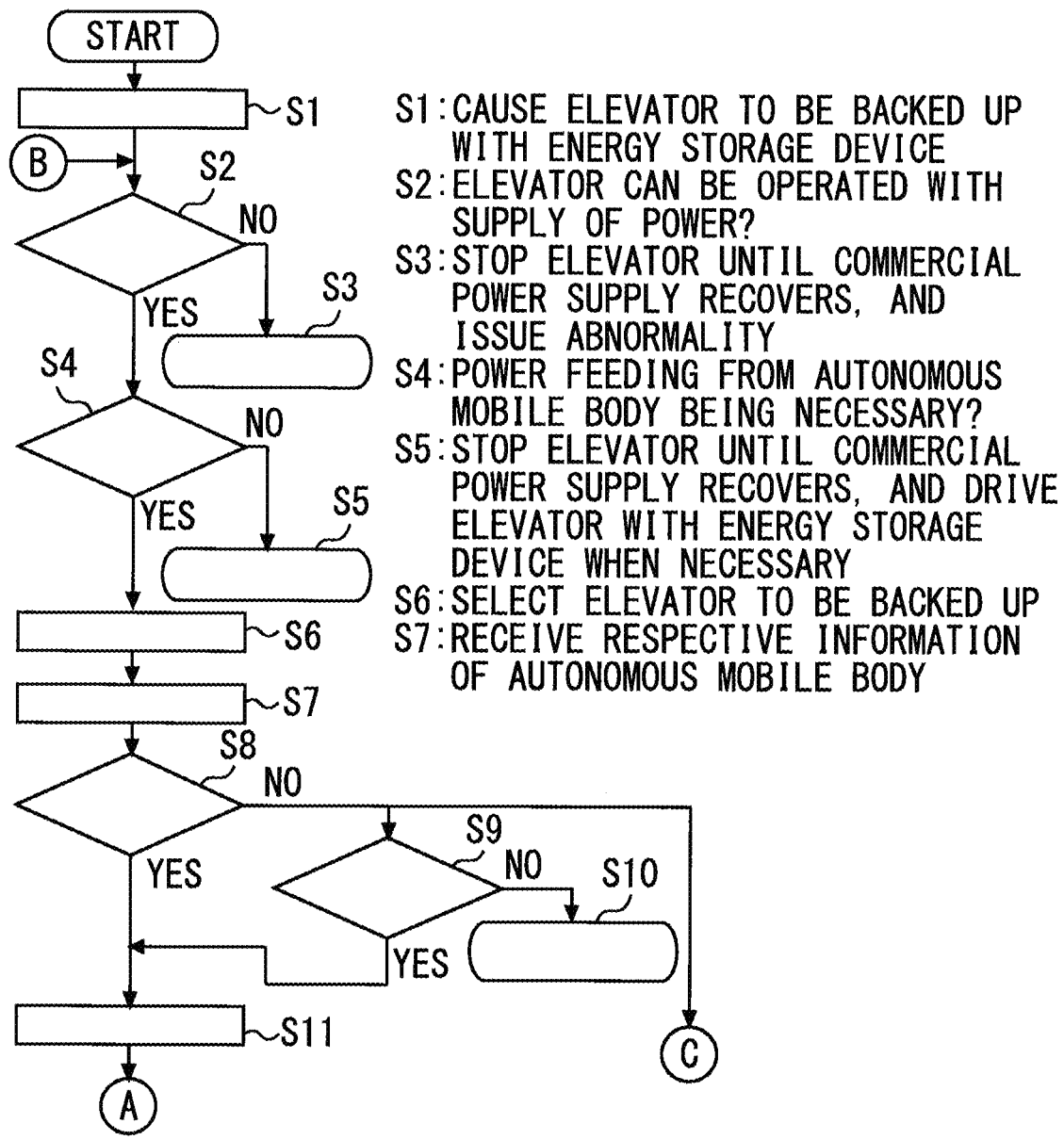

S1: CAUSE ELEVATOR TO BE BACKED UP WITH ENERGY STORAGE DEVICE
S2: ELEVATOR CAN BE OPERATED WITH SUPPLY OF POWER?
S3: STOP ELEVATOR UNTIL COMMERCIAL POWER SUPPLY RECOVERS, AND ISSUE ABNORMALITY
S4: POWER FEEDING FROM AUTONOMOUS MOBILE BODY BEING NECESSARY?
S5: STOP ELEVATOR UNTIL COMMERCIAL POWER SUPPLY RECOVERS, AND DRIVE ELEVATOR WITH ENERGY STORAGE DEVICE WHEN NECESSARY
S6: SELECT ELEVATOR TO BE BACKED UP
S7: RECEIVE RESPECTIVE INFORMATION OF AUTONOMOUS MOBILE BODY
S8: POWER CAN BE SUPPLIED FROM SPECIFIC AUTONOMOUS MOBILE BODY?
S9: POWER CAN BE SUPPLIED FROM ANOTHER AUTONOMOUS MOBILE BODY?
S10: STOP ELEVATOR UNTIL COMMERCIAL POWER SUPPLY RECOVERS, AND DRIVE ELEVATOR WITH ENERGY STORAGE DEVICE WHEN NECESSARY
S11: CALL AUTONOMOUS MOBILE BODY TO VICINITY OF POWER SUPPLY DEVICE

FIG. 10

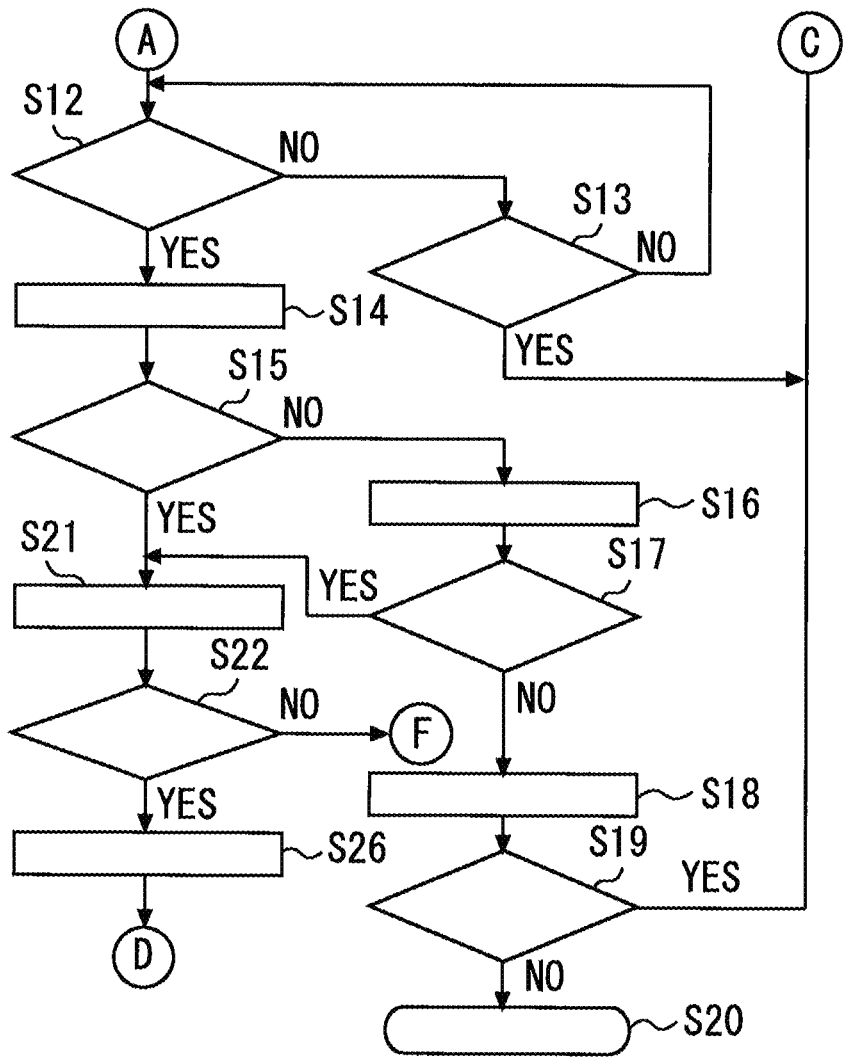

S12: ARRIVED IN VICINITY OF POWER SUPPLY DEVICE?
S13: HAVING CAUSE OF BEING UNABLE TO ARRIVE?
S14: GUIDE AUTONOMOUS MOBILE BODY TO POWER SUPPLY DEVICE
S15: NORMAL CONNECTION BEING MADE?
S16: GUIDE AUTONOMOUS MOBILE BODY TO POWER SUPPLY DEVICE
S17: NORMAL CONNECTION BEING MADE?
S18: COMMAND AUTONOMOUS MOBILE BODY TO LEAVE POWER
 SUPPLY DEVICE
S19: LEFT POWER SUPPLY DEVICE?
S20: STOP ELEVATOR UNTIL COMMERCIAL POWER SUPPLY
 RECOVERS, AND ISSUE ABNORMALITY
S21: MAINTAIN NORMAL CONNECTION
S22: ELEVATOR CAN BE BACKED UP?
S26: TURN ON CONVERTER (CONTACTOR WHEN CONVERTER IS NOT
 PROVIDED) TO CHARGE DC LINK

FIG. 11

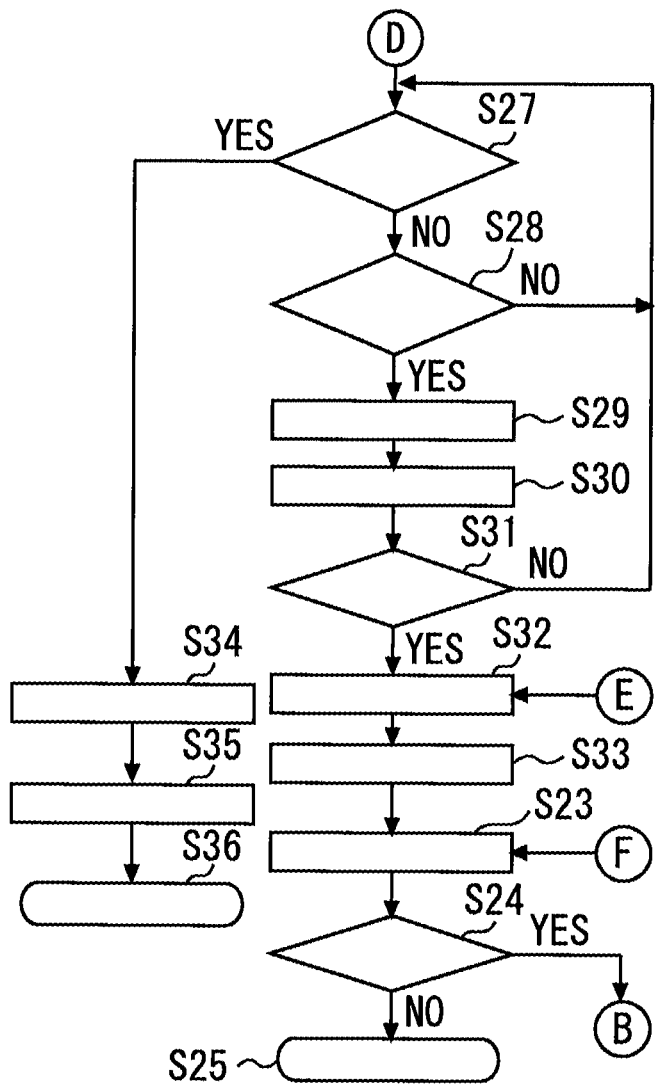

S27: COMMERCIAL POWER SUPPLY RECOVERED?
S28: CAR CALL BEING PUSHED?
S29: START DRIVING OF ELEVATOR
S30: CAUSE CAR TO STOP ON TARGET FLOOR
S31: REMAINING POWER BEING LOWER THAN FIXED VALUE?
S32: CAUSE INFORMATION INDICATING END OF OPERATION TO BE OUTPUTTED BY AUDIO OR VIDEO
S33: RELEASE AUTONOMOUS MOBILE BODY FROM CONNECTION WITH POWER SUPPLY DEVICE
S23: COMMAND AUTONOMOUS MOBILE BODY TO LEAVE POWER SUPPLY DEVICE
S24: LEFT POWER SUPPLY DEVICE?
S25: STOP ELEVATOR UNTIL COMMERCIAL POWER SUPPLY RECOVERS, AND ISSUE ABNORMALITY
S34: RELEASE AUTONOMOUS MOBILE BODY FROM CONNECTION WITH POWER SUPPLY DEVICE
S35: COMMAND AUTONOMOUS MOBILE BODY TO LEAVE POWER SUPPLY DEVICE
S36: RESTART NORMAL OPERATION

FIG. 14

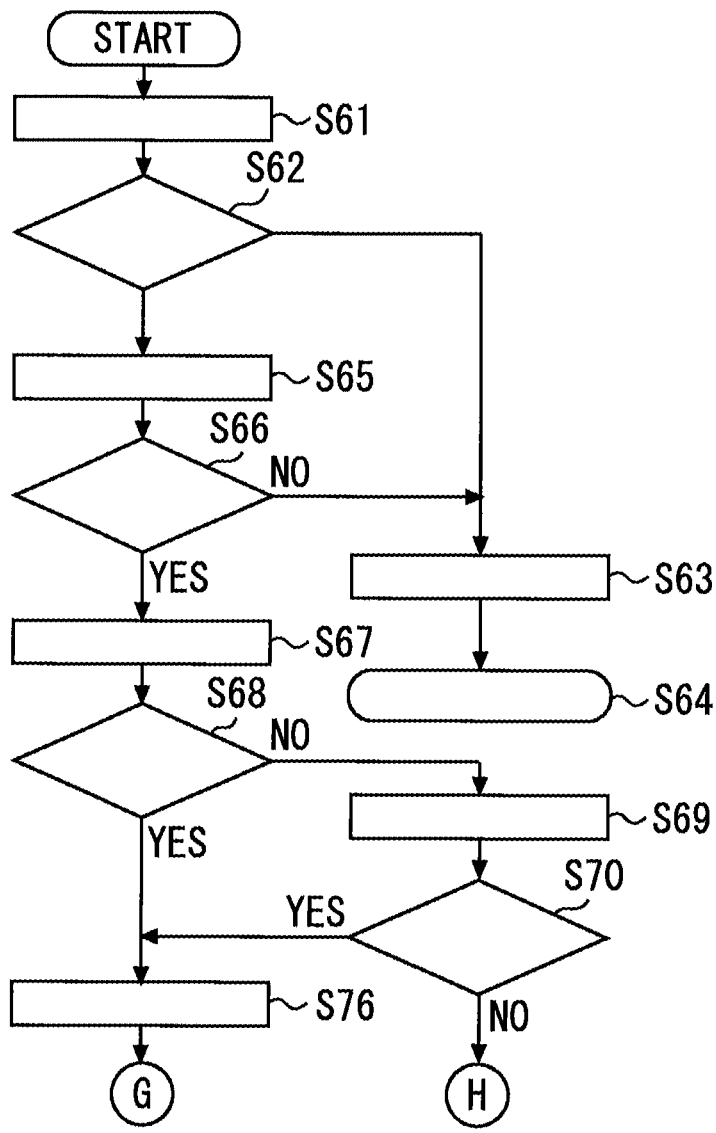

S61: REQUEST CHARGING BY WIRELESS COMMUNICATION
S62: POWER CAN BE SUPPLIED?
S63: NOTIFY REJECTION INFORMATION
S64: CHARGING CANNOT BE PERFORMED
S65: ELEVATOR RECEIVING RESPECTIVE INFORMATION OF ROBOT BY WIRELESS COMMUNICATION
S66: POWER CAN BE SUPPLIED TO AUTONOMOUS MOBILE BODY?
S67: GUIDE AUTONOMOUS MOBILE BODY TO POWER SUPPLY DEVICE
S68: NORMAL CONNECTION BEING MADE?
S69: GUIDE AUTONOMOUS MOBILE BODY TO POWER SUPPLY DEVICE
S70: NORMAL CONNECTION BEING MADE?
S76: MAINTAIN NORMAL CONNECTION

FIG. 15

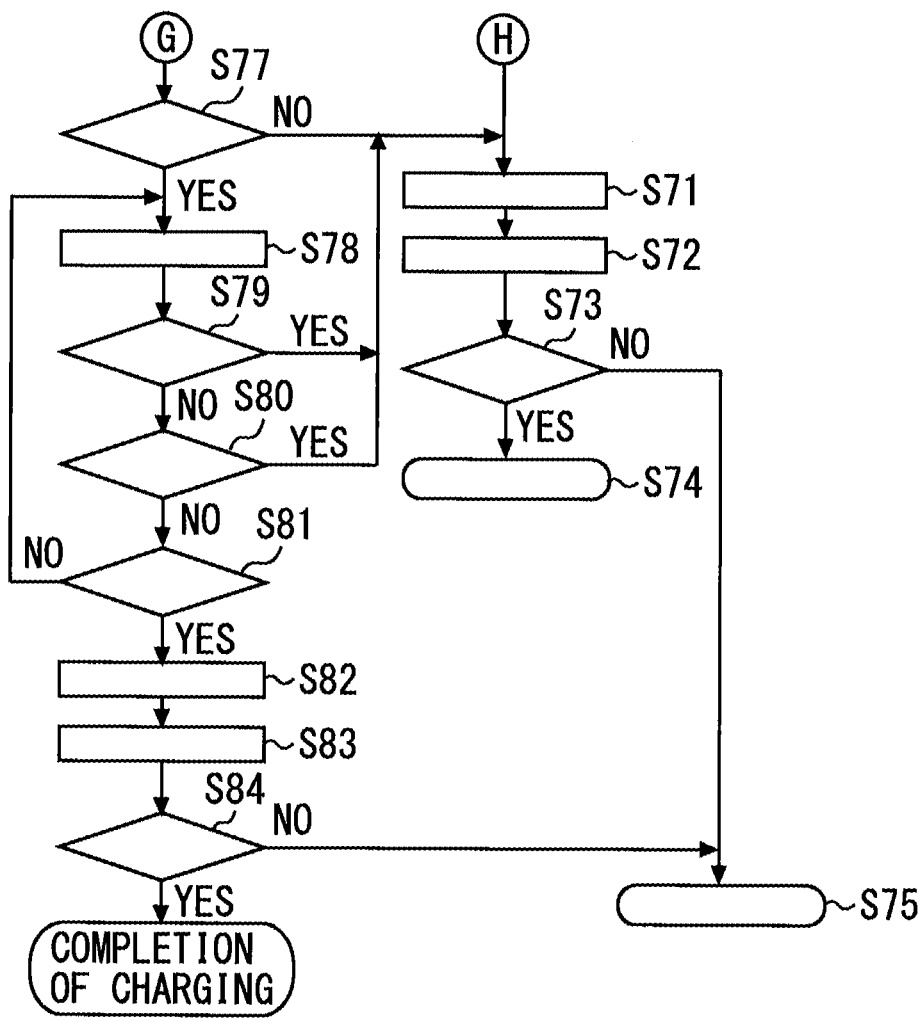

S71: NOTIFY REJECTION INFORMATION
S72: COMMAND AUTONOMOUS MOBILE BODY TO LEAVE POWER SUPPLY DEVICE
S73: LEFT POWER SUPPLY DEVICE?
S74: CHARGING CANNOT BE PERFORMED
S75: ISSUE ABNORMALITY
S77: POWER CAN BE SUPPLIED TO AUTONOMOUS MOBILE BODY?
S78: START SUPPLY OF POWER
S79: HAVING ABNORMALITY?
S80: NECESSARY TO SEPARATE?
S81: CHARGING COMPLETED?
S82: NOTIFY COMPLETION OF CHARGING, AND RELEASE AUTONOMOUS MOBILE BODY FROM CONNECTION
S83: COMMAND AUTONOMOUS MOBILE BODY TO LEAVE POWER SUPPLY DEVICE
S84: LEFT POWER SUPPLY DEVICE?

ELEVATOR SYSTEM

CROSS-REFERENCE TO RELATED APPLICATION

The present application is based on PCT filing PCT/JP2018/026697, filed Jul. 17, 2018, the entire contents of which are incorporated herein by reference.

FIELD

This invention relates to an elevator system.

BACKGROUND

PTL 1 discloses an elevator system. According to the elevator system, an elevator can be supplied with power from an electric vehicle.

CITATION LIST

Patent Literature

[PTL 1] Japanese Patent No. 6129061

SUMMARY

Technical Problem

However, in the elevator system disclosed in PTL 1, it is necessary for a person to drive an electric vehicle to the vicinity of the elevator. Therefore, if a driver of the electric vehicle cannot be obtained, power is not supplied to the elevator.

This invention has been made to overcome the above-mentioned problem. An object of this invention is to provide an elevator system which can easily supply power to an elevator.

Solution to Problem

An elevator system according to this invention includes a coordinating device configured to command an autonomous mobile body which moves inside a building provided with an elevator to supply power to the elevator in a case where the coordinating device determines that a supply of power from the autonomous mobile body to the elevator is necessary.

Advantageous Effects of Invention

According to this invention, when a supply of power to the elevator is necessary, the autonomous mobile body supplies power to the elevator. Therefore, power can be easily supplied to the elevator.

BRIEF DESCRIPTION OF DRAWINGS

FIG. 9 is a flowchart for describing the summary of the operation of a control panel when the elevator system of the embodiment 1 is supplied with power from the autonomous mobile body.

FIG. 10 is a flowchart for describing the summary of the operation of the control panel when the elevator system of the embodiment 1 is supplied with power from the autonomous mobile body.

FIG. 11 is a flowchart for describing the summary of the operation of the control panel when the elevator system of the embodiment 1 is supplied with power from the autonomous mobile body.

FIG. 14 is a flowchart for describing the summary of operations of the autonomous mobile body and the control panel when the elevator system of the embodiment 1 supplies power to the autonomous mobile body.

FIG. 15 is a flowchart for describing the summary of the operations of the autonomous mobile body and the control panel when the elevator system of the embodiment 1 supplies power to the autonomous mobile body.

DESCRIPTION OF EMBODIMENTS

Modes for carrying out this invention will be described with reference to attached drawings. In the respective drawings, identical or corresponding components are given the same reference symbols. The repeated description of such components will be simplified or omitted when appropriate.

Embodiment 1

Figure 1:
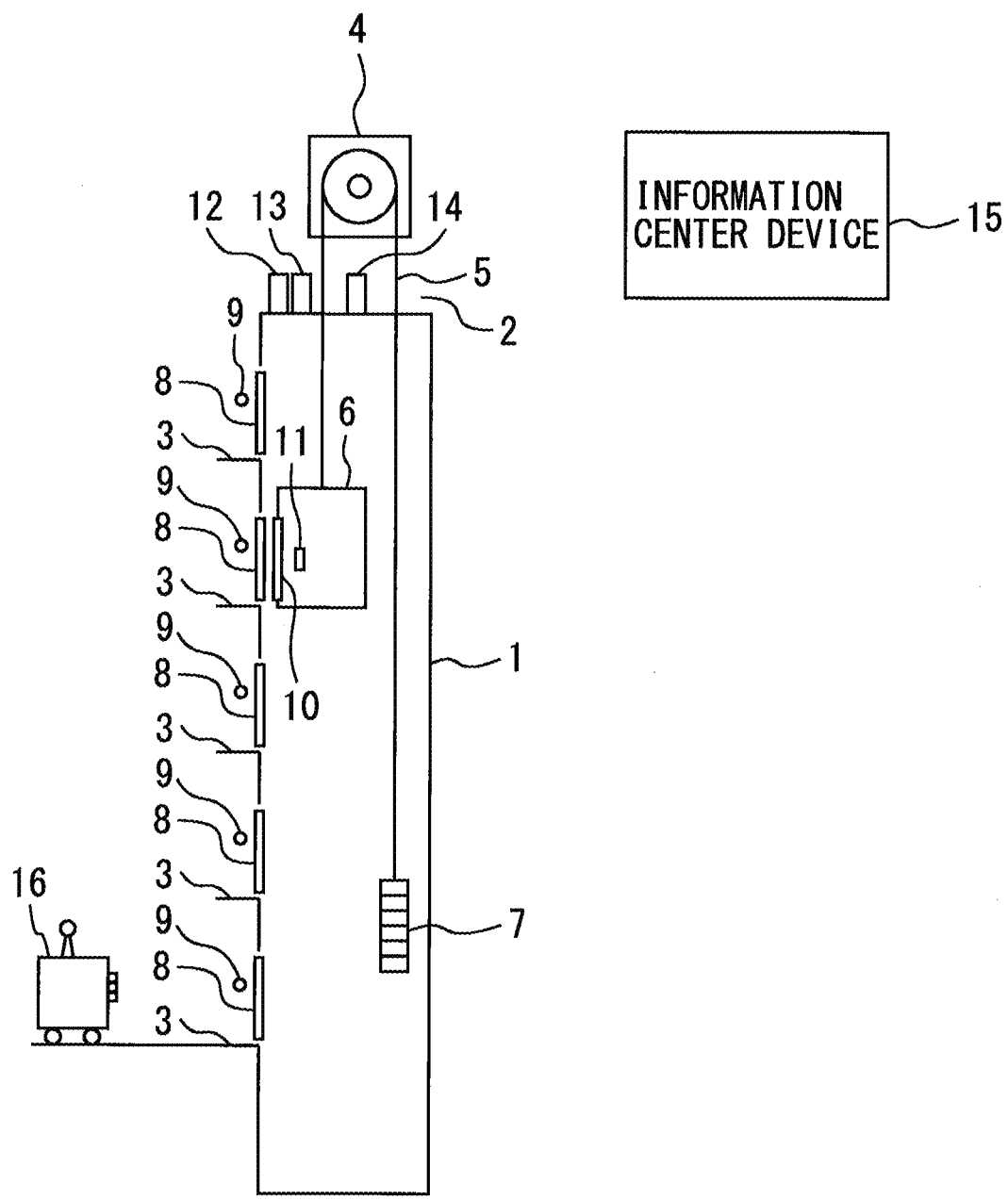
FIG. 1 is a configuration diagram of an elevator system of an embodiment 1.

FIG. 1 is a configuration diagram of an elevator system of an embodiment 1.

In the elevator system shown in FIG. 1, a hoistway 1 penetrates through respective floors of a building not shown in the drawing. A machine room 2 is provided immediately above the hoistway 1. A plurality of halls 3 are provided to respective floors of the building. Each of the plurality of halls 3 faces the hoistway 1.

A traction machine 4 is provided in the machine room 2. A main rope 5 is wound onto the traction machine 4.

A car 6 is provided in the hoistway 1. The car 6 is suspended from one end of the main rope 5. A counter weight 7 is provided in the hoistway 1. The counter weight 7 is suspended from the other end of the main rope 5.

A plurality of hatch doors 8 are provided to respective doorways of the plurality of halls 3. A plurality of hall operating panels 9 are provided to the plurality of respective halls 3. A car door 10 is provided to the doorway of the car 6. A car operating panel 11 is provided in the car 6.

A control panel 12 is provided in the machine room 2. The control panel 12 is electrically connected to the traction machine 4 and equipment of the car 6. The control panel 12 is provided such that the control panel 12 can perform overall control of the elevator.

A monitoring device 13 is provided in the machine room 2. The monitoring device 13 is electrically connected to the control panel 12. The monitoring device 13 is provided such that the monitoring device 13 can monitor the state of the elevator based on information from the control panel 12.

An energy storage device 14 is provided in the machine room 2. The energy storage device 14 is provided such that the energy storage device 14 can supply power to the control panel 12 and the monitoring device 13 when a commercial power supply is cut off.

An information center device 15 is provided to a place separated from the building provided with the elevator. For example, the information center device 15 may be provided to the maintenance company for the elevator. The information center device 15 is provided such that the information center device 15 can grasp the state of the elevator based on information from the monitoring device 13.

For example, an autonomous mobile body 16 may be disposed in the building provided with the elevator. For example, the autonomous mobile body 16 may be disposed in a building next to the building provided with the elevator. For example, the autonomous mobile body 16 may be disposed at a storage battery replacement place for electric vehicles.

For example, the autonomous mobile body 16 may be a robot. For example, the autonomous mobile body 16 may be a drone. The autonomous mobile body 16 includes a storage battery not shown in FIG. 1. The autonomous mobile body 16 is provided such that the autonomous mobile body 16 can autonomously move inside the building using power of the storage battery. For example, the autonomous mobile body 16 may be provided such that the autonomous mobile body 16 can move to the machine room 2. For example, the autonomous mobile body 16 may be provided such that the autonomous mobile body 16 can move to each of the plurality of halls 3. For example, the autonomous mobile body 16 may be provided such that the autonomous mobile body 16 can move into the car 6.

Next, a first example of a coordination between the elevator system and the autonomous mobile body 16 will be described with reference to FIG. 2 to FIG. 4.

Figure 2:
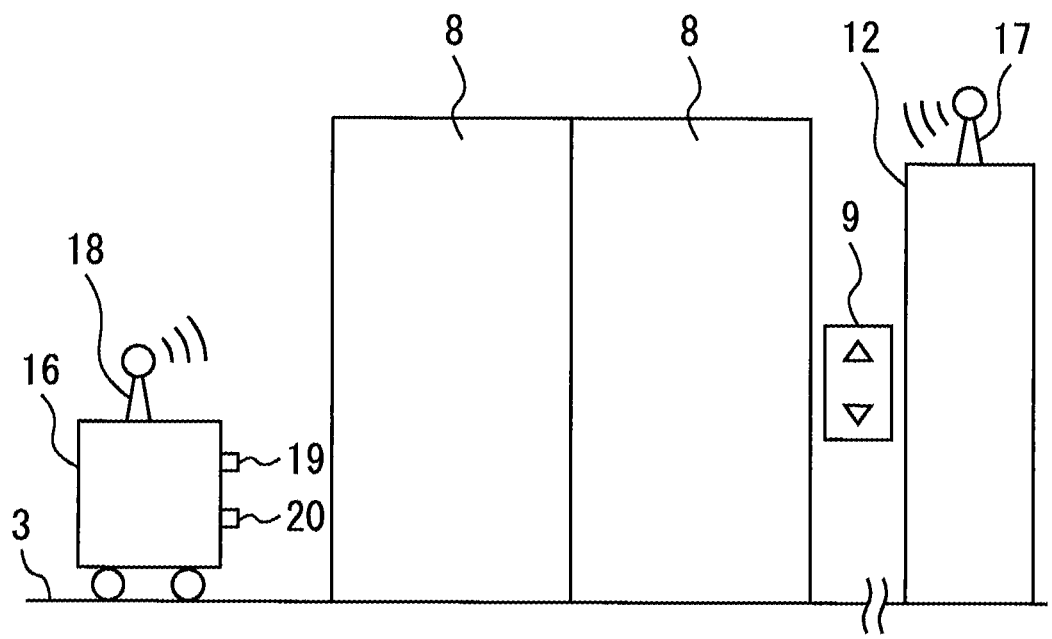
FIG. 2 is a view for describing a first example of a coordination between the elevator system of the embodiment 1 and an autonomous mobile body.
Figure 3:
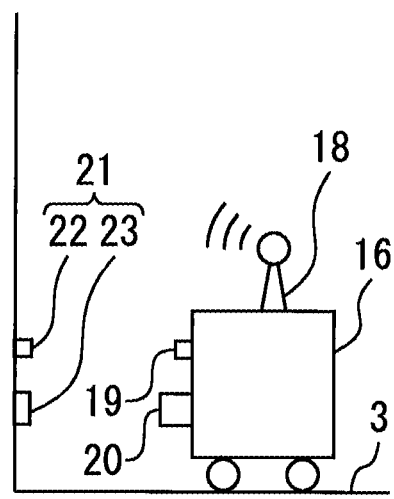
FIG. 3 is a view for describing the first example of the coordination between the elevator system of the embodiment 1 and the autonomous mobile body.
Figure 4:
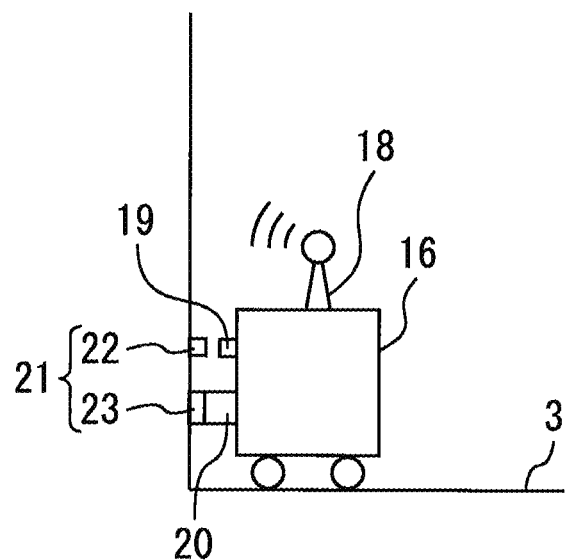
FIG. 4 is a view for describing the first example of the coordination between the elevator system of the embodiment 1 and the autonomous mobile body.

FIG. 2 to FIG. 4 are views for describing the first example of the coordination between the elevator system of the embodiment 1 and the autonomous mobile body.

As shown in FIG. 2, the control panel 12 includes an elevator-side communication device 17.

The autonomous mobile body 16 includes a mobile-body-side communication device 18, a mobile-body-side sensor 19, and a mobile-body-side connector 20.

As shown in FIG. 3, a power supply device 21 is provided to the wall surface of the hall 3. The power supply device 21 includes an elevator-side sensor 22 and an elevator-side connector 23.

As shown in FIG. 2, when the control panel 12, as a coordinating device, determines that transmission and reception of power between the elevator system and the autonomous mobile body 16 is necessary, the control panel 12 sends command information via the elevator-side communication device 17. The autonomous mobile body 16 receives the command information via the mobile-body-side communication device 18.

At this point of operation, as shown in FIG. 2, the autonomous mobile body 16 starts to move based on the command information. Thereafter, as shown in FIG. 3, the autonomous mobile body 16 moves based on alignment performed by the mobile-body-side sensor 19 and the elevator-side sensor 22. Then, as shown in FIG. 4, the autonomous mobile body 16 moves until the mobile-body-side connector 20 is mechanically and electrically connected to the elevator-side connector 23.

In this state, the control panel 12 performs a control during transmission and reception of power between the elevator system and the autonomous mobile body 16.

Next, an example of the elevator-side connector 23 and the mobile-body-side connector 20 will be described with reference to FIG. 5.

Figure 5:
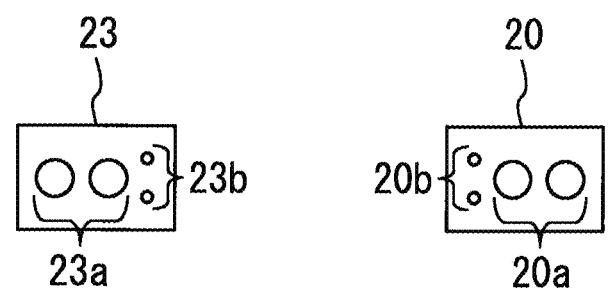
FIG. 5 is a view for describing an example of a coordination between an elevator-side connector of the elevator system of the embodiment 1 and a mobile-body-side connector of the autonomous mobile body.

FIG. 5 is a view for describing an example of a coordination between the elevator-side connector of the elevator system of the embodiment 1 and the mobile-body-side connector of the autonomous mobile body.

As shown in FIG. 5, the elevator-side connector 23 includes elevator-side power supply parts 23a and elevator-side signal parts 23b. The mobile-body-side connector 20 includes mobile-body-side power supply parts 20a and mobile-body-side signal parts 20b.

When the elevator-side connector 23 and the mobile-body-side connector 20 are connected with each other, the elevator-side power supply parts 23a and the mobile-body-side power supply part 20a are mechanically and electrically connected with each other. The elevator-side signal parts 23b and the mobile-body-side signal parts 20b are mechanically and electrically connected with each other or approach each other to within a distance which allows wireless communication.

Next, a second example of the coordination between the elevator system and the autonomous mobile body 16 will be described with reference to FIG. 6.

Figure 6:
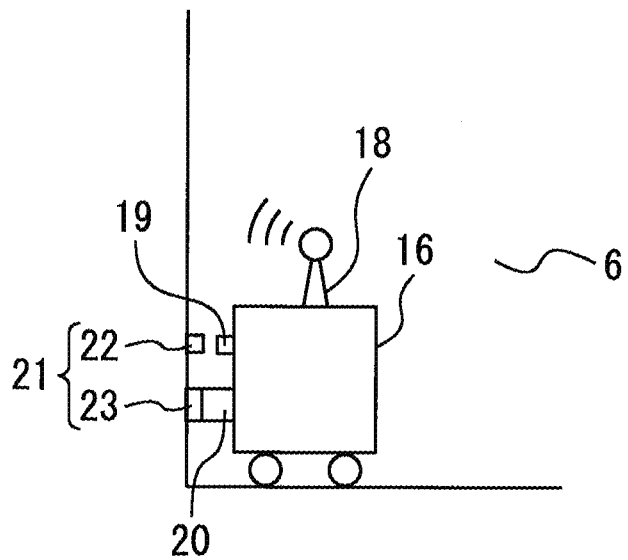
FIG. 6 is a view for describing a second example of the coordination between the elevator system of the embodiment 1 and the autonomous mobile body.

FIG. 6 is a view for describing the second example of the coordination between the elevator system of the embodiment 1 and the autonomous mobile body.

As shown in FIG. 6, the power supply device 21 is also provided to the inner wall surface of the car 6.

When the control panel 12 determines that transmission and reception of power between the elevator system and the autonomous mobile body 16 is necessary, the control panel 12 sends command information via the elevator-side communication device 17. The autonomous mobile body 16 receives the command information via the mobile-body-side communication device 18.

At this point of operation, the autonomous mobile body 16 starts to move based on the command information. Thereafter, the autonomous mobile body 16 moves based on alignment performed by the mobile-body-side sensor 19 and the elevator-side sensor 22. Thereafter, the autonomous mobile body 16 moves until the mobile-body-side connector 20 is mechanically and electrically connected to the elevator-side connector 23.

Next, a third example of the coordination between the elevator system and the autonomous mobile body 16 will be described with reference to FIG. 7.

Figure 7:
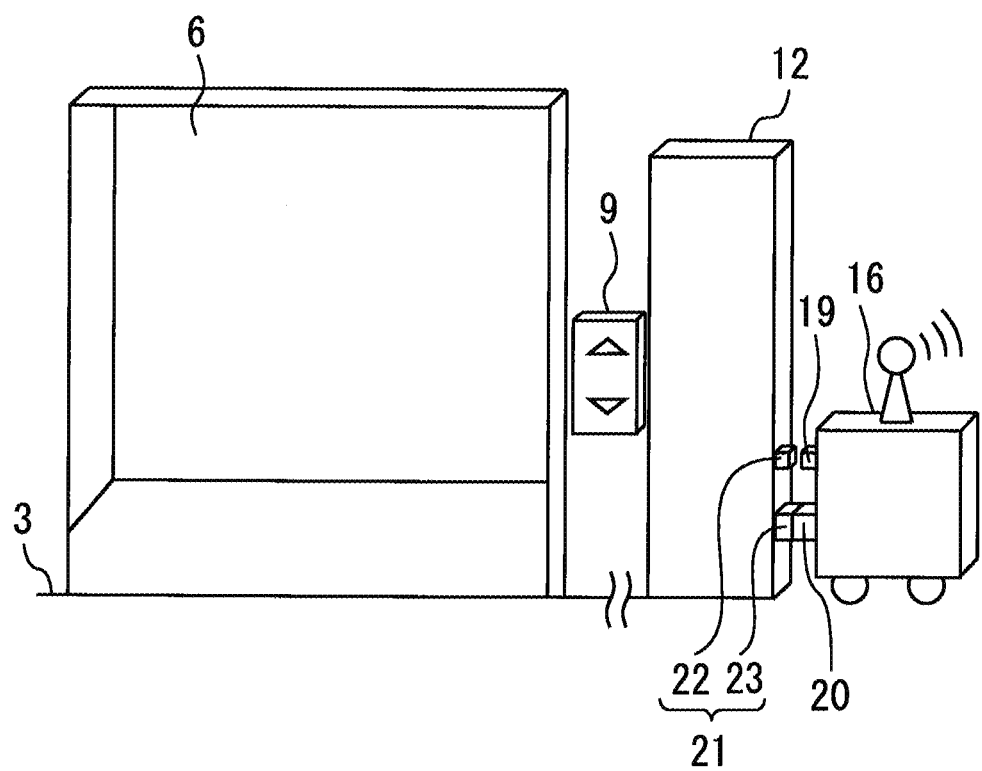
FIG. 7 is a view for describing a third example of the coordination between the elevator system of the embodiment 1 and the autonomous mobile body.

FIG. 7 is a view for describing the third example of the coordination between the elevator system of the embodiment 1 and the autonomous mobile body.

As shown in FIG. 7, the power supply device 21 is also provided to the outer wall surface of the control panel 12.

When the control panel 12 determines that transmission and reception of power between the elevator system and the autonomous mobile body 16 is necessary, the control panel 12 sends command information via the elevator-side communication device 17. The autonomous mobile body 16 receives the command information via the mobile-body-side communication device 18.

At this point of operation, the autonomous mobile body 16 starts to move based on the command information. Thereafter, the autonomous mobile body 16 moves based on alignment performed by the mobile-body-side sensor 19 and the elevator-side sensor 22. Then, the autonomous mobile body 16 moves until the mobile-body-side connector 20 is mechanically and electrically connected to the elevator-side connector 23.

Next, transmission and reception of power between the elevator system and the autonomous mobile body 16 will be described with reference to FIG. 8.

Figure 8:
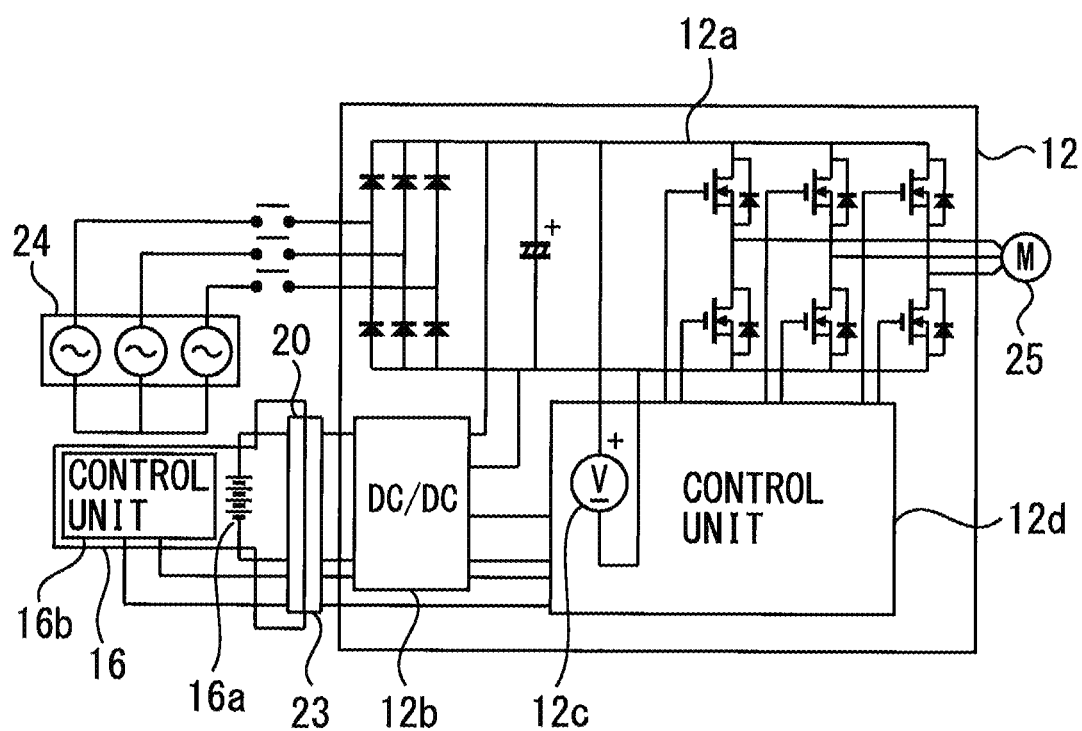
FIG. 8 is a circuitry diagram for describing transmission and reception of power between the elevator system of the embodiment 1 and the autonomous mobile body.

FIG. 8 is a circuitry diagram for describing transmission and reception of power between the elevator system of the embodiment 1 and the autonomous mobile body.

In FIG. 8, a commercial power supply 24 is provided such that the commercial power supply 24 can supply AC power.

A motor 25 is provided to the traction machine 4 not shown in FIG. 8. The motor 25 is provided such that the motor 25 can generate a driving force for the traction machine 4.

The control panel 12 includes a power converter 12a, a DC/DC converter 12b, a voltmeter 12c, and a control unit 12d.

The power converter 12a is provided such that the power converter 12a can convert AC power from the commercial power supply 24 to DC power. The power converter 12a is provided such that the power converter 12a can convert the DC power to AC power. The power converter 12a is provided such that the power converter 12a can supply the AC power to the motor 25.

The DC/DC converter 12b is provided such that the DC/DC converter 12b can convert an inputted DC voltage to a desired DC voltage.

The voltmeter 12c is provided such that the voltmeter 12c can detect a DC voltage of a DC link of the power converter 12a.

The control unit 12d is provided such that the control unit 12d can control the power converter 12a based on the detection result of the voltmeter 12c. The control unit 12d is provided such that the control unit 12d can control the DC/DC converter 12b through at least one wire based on the detection result of the voltmeter 12c. For example, the control unit 12d may be provided such that the control unit 12d can output an input/output voltage command to the DC/DC converter 12b. For example, the control unit 12d may be provided such that the control unit 12d can control the operation of the DC/DC converter 12b and the stopping of the operation of the DC/DC converter 12b. For example, the control unit 12d may be provided such that the control unit 12d can detect an abnormality of the DC/DC converter 12b.

The autonomous mobile body 16 includes a storage battery 16a and a control unit 16b.

The storage battery 16a is provided such that the storage battery 16a can supply DC power to the autonomous mobile body 16.

The control unit 16b is provided such that the control unit 16b can control the operation of the autonomous mobile body 16. The control unit 16b is provided such that the control unit 16b can communicate with the control unit 12d through wires. The control unit 16b is provided such that the control unit 16b can control the DC/DC converter 12b through at least one wire. For example, the control unit 16b may be provided such that the control unit 16b can output an input/output voltage command to the DC/DC converter 12b. For example, the control unit 16b may be provided such that the control unit 16b can control the operation of the DC/DC converter 12b and the stopping of the operation of the DC/DC converter 12b. For example, the control unit 16b may be provided such that the control unit 16b can detect an abnormality of the DC/DC converter 12b.

When the elevator system is supplied with DC power from the autonomous mobile body 16, the DC/DC converter 12b converts a DC voltage from the storage battery 16a to a desired DC voltage. The DC/DC converter 12b supplies, to the control unit 12d, a DC voltage matched to the control unit 12d. The DC/DC converter 12b supplies, to the DC link of the power converter 12a, a DC voltage matched to the DC link of the power converter 12a.

When the elevator system supplies DC power to the autonomous mobile body 16, the DC/DC converter 12b converts a DC voltage obtained from regenerative power of the elevator to a charging voltage of the storage battery 16a. The DC/DC converter 12b supplies the charging voltage to the storage battery 16a.

Next, the summary of the operation of the control panel 12 when the elevator system is supplied with power from the autonomous mobile body 16 will be described with reference to FIG. 9 to FIG. 11.

FIG. 9 to FIG. 11 are flowcharts for describing the summary of the operation of the control panel when the elevator system of the embodiment 1 is supplied with power from the autonomous mobile body.

When the commercial power supply 24 is cut off due to power failure or the like, the control panel 12 performs the operation in step S1. In step S1, the control panel 12 causes the elevator to be backed up with the energy storage device 14. Thereafter, the control panel 12 performs the operation in step S2. In step S2, the control panel 12 determines whether or not the elevator can be operated with a supply of power.

In the case where the elevator cannot be operated even with a supply of power in step S2, the control panel 12 performs the operation in step S3. In step S3, the control panel 12 stops the elevator until the commercial power supply 24 recovers, and the control panel 12 issues an abnormality.

In the case where the elevator can be operated with a supply of power in step S2, the control panel 12 performs the operation in step S4. In step S4, the control panel 12 determines whether or not power feeding from the autonomous mobile body 16 is necessary.

In the case where power feeding from the autonomous mobile body 16 is not necessary in step S4, the control panel 12 performs the operation in step S5. In step S5, the control panel 12 stops the elevator until the commercial power supply 24 recovers, and the control panel 12 drives the elevator with the energy storage device 14 when necessary.

In the case where power feeding from the autonomous mobile body 16 is necessary in step S4, the control panel 12 performs the operation in step S6. In step S6, the control panel 12 communicates with the control panel 12 of an adjacent elevator to select the elevator to be backed up. For example, an elevator where the energy consumption can be reduced may be selected as the elevator to be backed up. For example, as an elevator to be backed up, an elevator may be selected where the floor on which the car 6 provided with the power supply device 21 is located and the floor on which the autonomous mobile body 16 is located are closest.

In the case where the own elevator is selected as the elevator to be backed up in step S6, the control panel 12 performs the operation in step S7. In step S7, the control panel 12 receives respective information of the autonomous mobile body 16 by wireless communication. In the case where there are a plurality of autonomous mobile bodies 16, the control panel 12 receives respective information from the plurality of respective autonomous mobile bodies 16.

For example, the control panel 12 may receive storage battery information, such as remaining power, the rated power, and the rated voltage of the autonomous mobile body 16, from the autonomous mobile body 16. For example, the control panel 12 may receive, from the autonomous mobile body 16, information on whether or not power can be supplied to the elevator. For example, the control panel 12 may receive, from the autonomous mobile body 16, information on whether or not the autonomous mobile body 16 can move to the vicinity of the power supply device 21. For example, the control panel 12 may receive information on whether or not the autonomous mobile body 16 is provided with the corresponding mobile-body-side connector 20.

Thereafter, the control panel 12 performs the operation in step S8. In step S8, the control panel 12 determines whether or not power can be supplied from the specific autonomous mobile body 16.

In the case where power cannot be supplied from the specific autonomous mobile body 16 in step S8, the control panel 12 performs the operation in step S9. In step S9, the control panel 12 determines whether or not power can be supplied from another autonomous mobile body 16. At this point of operation, the control panel 12 may determine whether or not power can be supplied based on the sum of remaining power of the storage batteries 16a of the plurality of autonomous mobile bodies 16.

In the case where power cannot be supplied from another autonomous mobile body 16 in step S9, the control panel 12 performs the operation in step S10. In step S10, the control panel 12 stops the elevator until the commercial power supply 24 recovers, and the control panel 12 drives the elevator with the energy storage device 14 when necessary.

In the case where power can be supplied in step S8 or step S9, the control panel 12 performs the operation in step S11.

In step S11, the control panel 12 calls the autonomous mobile body 16 to the vicinity of the power supply device 21 by wireless communication. In the case where there are the plurality of autonomous mobile bodies 16, the autonomous mobile body 16 having the most remaining power may be called. Further, the plurality of autonomous mobile bodies 16 may be called to be ready for backup over a long period of time. The call may be performed by the control panel 12 of another elevator or a control tower.

The determination on whether or not a power supply is necessary may be set in advance for respective elevators. Alternatively, a setting may be set such that power is supplied to the elevator when a car call is registered via the car operating panel 11. In the case where the setting is set such that power is supplied to the elevator when a car call is registered via the car operating panel 11, the person who registers the car call may be informed by video or audio that it takes time for the autonomous mobile body 16 to arrive. At this point of operation, the autonomous mobile body 16 may be called to the vicinity of the elevator in advance so as to shorten a time required for the autonomous mobile body 16 to arrive.

After step S11, the control panel 12 performs the operation in step S12. In step S12, the control panel 12 determines by wireless communication or sensors whether or not the autonomous mobile body 16 has arrived in the vicinity of the power supply device 21.

In the case where the autonomous mobile body 16 has not arrived in the vicinity of the power supply device 21 in step S12, the control panel 12 performs the operation in step S13. In step S13, the control panel 12 determines whether or not the autonomous mobile body 16 has a cause of being unable to arrive.

In the case where the autonomous mobile body 16 does not have a cause of being unable to arrive in step S13, the control panel 12 performs the operation in step S12. At this point of operation, a timeout may be set to prevent an endless loop. In the case where the autonomous mobile body 16 has a cause of being unable to arrive in step S13, the control panel 12 performs the operation in step S9.

In the case where the autonomous mobile body 16 has arrived in the vicinity of the power supply device 21 in step S12, the control panel 12 performs the operation in step S14. In step S14, the control panel 12 guides the autonomous mobile body 16 to the power supply device 21 by wireless communication or sensors. Thereafter, the control panel 12 performs the operation in step S15. In step S15, the control panel 12 determines whether or not a normal connection is made between the elevator-side connector 23 and the mobile-body-side connector 20.

In the case where the normal connection is not made in step S15, the control panel 12 performs the operation in step S16. In step S16, the control panel 12 guides the autonomous mobile body 16 to the power supply device 21 again by wireless communication or sensors. At this point of operation, guiding may be attempted plural times. Thereafter, the control panel 12 performs the operation in step S17. In step S17, the control panel 12 determines whether or not the normal connection is made between the elevator-side connector 23 and the mobile-body-side connector 20.

In the case where the normal connection is not made in step S17, the control panel 12 performs the operation in step S18. In step S18, the control panel 12 commands the autonomous mobile body 16 to leave the power supply device 21. Thereafter, the control panel 12 performs the operation in step S19. In step S19, the control panel 12 determines whether or not the autonomous mobile body 16 has left the power supply device 21.

In the case where the autonomous mobile body 16 has left the power supply device 21 in step S19, the control panel 12 performs the operation in step S9. In the case where the autonomous mobile body 16 does not leave the power supply device 21 in step S19, the control panel 12 performs the operation in step S20. In step S20, the control panel 12 stops the elevator until the commercial power supply 24 recovers, and the control panel 12 issues an abnormality.

In the case where the normal connection is made in step S15 or step S17, the control panel 12 performs the operation in step S21. In step S21, the control panel 12 maintains the normal connection by an electromagnetic lock or the like. At this point of operation, a warning may be given to users of the elevator not to touch the autonomous mobile body 16. Thereafter, the control panel 12 performs the operation in step S22. In step S22, the control panel 12 receives battery information, information of the amount of power which can be supplied and the like from the autonomous mobile body 16, and determines whether or not the elevator can be backed up based on the information.

In the case where the elevator cannot be backed up in step S22, the control panel 12 performs the operation in step S23. In step S23, the control panel 12 commands the autonomous mobile body 16 to leave the power supply device 21. Thereafter, the control panel 12 performs the operation in step S24. In step S24, the control panel 12 determines whether or not the autonomous mobile body 16 has left the power supply device 21.

In the case where the autonomous mobile body 16 has left the power supply device 21 in step S24, the control panel 12 performs the operation in step S2. In the case where the autonomous mobile body 16 does not leave the power supply device 21 in step S24, the control panel 12 performs the operation in step S25. In step S25, the control panel 12 stops the elevator until the commercial power supply 24 recovers, and the control panel 12 issues an abnormality.

In the case where the elevator can be backed up in step S22, the control panel 12 performs the operation in step S26. In step S26, the control panel 12 turns on the DC/DC converter 12b to charge the DC link of the power converter 12a. Thereafter, the control panel 12 performs the operation in step S27. In step S27, the control panel 12 determines whether or not the commercial power supply 24 has recovered.

In the case where the commercial power supply 24 has not recovered in step S27, the control panel 12 performs the operation in step S28. In step S28, the control panel 12 determines whether or not a car call is registered.

In the case where the car call is not registered in step S28, the control panel 12 performs the operation in step S27. In the case where the car call is registered in step S28, the control panel 12 performs the operation in step S29. In step S29, the control panel 12 starts the driving of the elevator. In the case where the car call is not registered, it is sufficient to reduce unnecessary standby power.

Thereafter, the control panel 12 performs the operation in step S30. In step S30, the control panel 12 causes the car 6 to stop on a target floor which corresponds to the car call. Then, the control panel 12 performs the operation in step S31. In step S31, the control panel 12 determines whether or not remaining power of the storage battery 16a of the autonomous mobile body 16 is lower than a fixed value.

In the case where the remaining power of the storage battery 16a of the autonomous mobile body 16 is not lower than the fixed value in step S31, the control panel 12 performs the operation in step S27. In the case where the remaining power of the storage battery 16a of the autonomous mobile body 16 is lower than the fixed value in step S31, the control panel 12 performs the operation in step S32.

In step S32, the control panel 12 causes information indicating the end of the operation to be outputted by audio or video in the car 6. At this point of operation, information indicating reception of a supply of power from another autonomous mobile body 16 may be outputted. Thereafter, the control panel 12 performs the operation in step S33. In step S33, the control panel 12 releases the autonomous mobile body 16 from the connection with the power supply device 21. Then, the control panel 12 performs the operation in step S23.

In the case where the commercial power supply 24 recovers in step S27, the control panel 12 performs the operation in step S34. In step S34, the control panel 12 releases the autonomous mobile body 16 from the connection with the power supply device 21. Thereafter, the control panel 12 performs the operation in step S35. In step S35, the control panel 12 commands the autonomous mobile body 16 to leave the power supply device 21. Then, the control panel 12 performs the operation in step S36. In step S36, the control panel 12 switches the supply source of power to the commercial power supply 24 and, thereafter, restarts the normal operation of the elevator.

Next, a first interrupting operation of the control panel 12 will be described with reference to FIG. 12.

Figure 12:
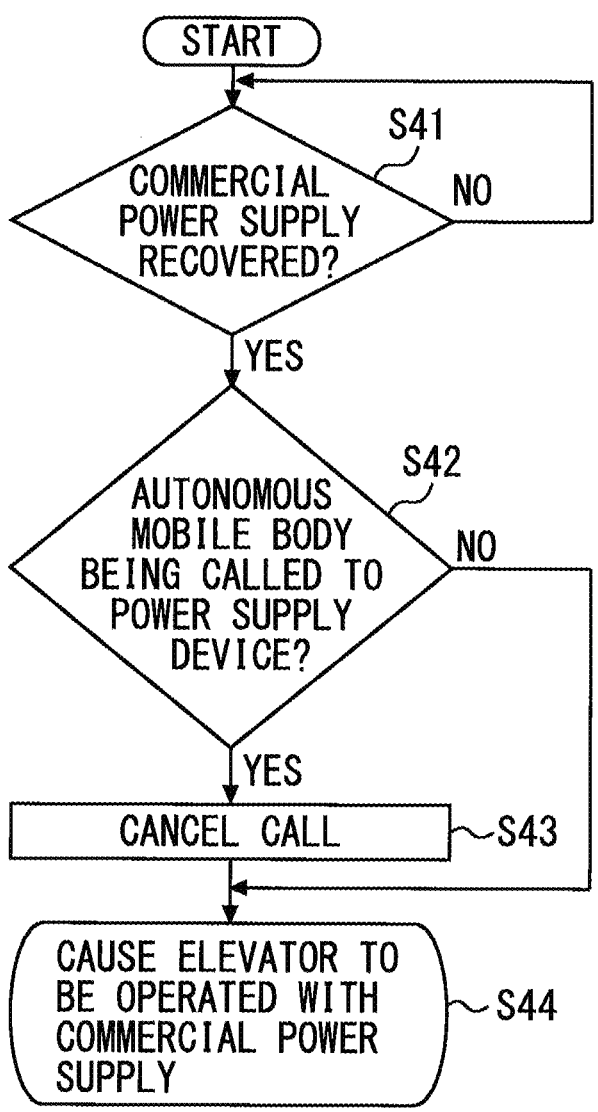
FIG. 12 is a flowchart for describing a first interrupting operation of the control panel of the elevator system of the embodiment 1.

FIG. 12 is a flowchart for describing the first interrupting operation of the control panel of the elevator system of the embodiment 1.

During a period where the autonomous mobile body 16 is connected with the power supply device 21, the first interrupting operation is invalid. During a period where the autonomous mobile body 16 is not connected with the power supply device 21, the first interrupting operation is valid.

In step S41, the control panel 12 determines whether or not the commercial power supply 24 has recovered. In the case where the commercial power supply 24 has not recovered in step S41, the control panel 12 continues the operation in step S41. In the case where the commercial power supply 24 has recovered in step S41, the control panel 12 performs the operation in step S42.

In step S42, the control panel 12 determines whether or not the autonomous mobile body 16 is called to the power supply device 21.

In the case where the autonomous mobile body 16 is called to the power supply device 21 in step S42, the control panel 12 performs the operation in step S43. In step S43, the control panel 12 cancels the call. Thereafter, the control panel 12 performs the operation in step S44. Also in the case where the autonomous mobile body 16 is not called to the power supply device 21 in step S42, the control panel 12 performs the operation in step S44. In step S44, the control panel 12 causes the elevator to be operated with the commercial power supply 24.

Next, a second interrupting operation of the control panel 12 will be described with reference to FIG. 13.

Figure 13:
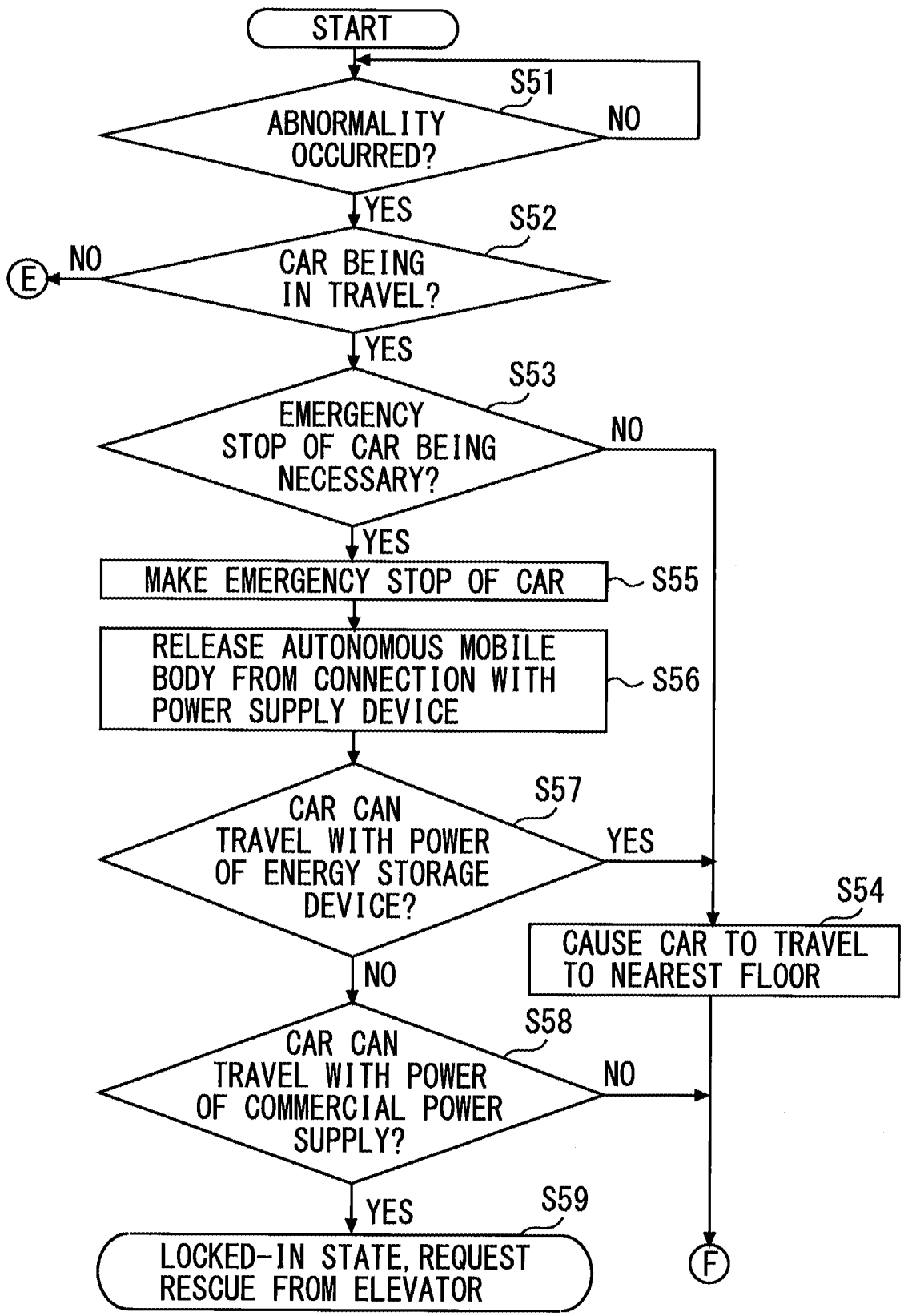
FIG. 13 is a flowchart for describing a second interrupting operation of the control panel of the elevator system of the embodiment 1.

FIG. 13 is a flowchart for describing the second interrupting operation of the control panel of the elevator system of the embodiment 1.

During a period where the autonomous mobile body 16 is connected with the power supply device 21, the second interrupting operation is valid. During a period where the autonomous mobile body 16 is not connected with the power supply device 21, the priority of the second interrupting operation is lower than the priority of the first interrupting operation.

In step S51, the control panel 12 determines whether or not an abnormality has occurred in the storage battery 16a or the like of the autonomous mobile body 16. In the case where no abnormality occurs in the storage battery 16a or the like of the autonomous mobile body 16 in step S51, the control panel 12 continues the operation in step S51. In the case where the abnormality has occurred in the storage battery 16a or the like of the autonomous mobile body 16 in step S51, the control panel 12 performs the operation in step S52.

In step S52, the control panel 12 determines whether or not the car 6 is in travel. In the case where the car 6 is not in travel in step S52, the control panel 12 performs the operation in step S32 shown in FIG. 11. In the case where the car 6 is in travel in step S52, the control panel 12 performs the operation in step S53.

In step S53, the control panel 12 determines whether or not an emergency stop of the car 6 is necessary. For example, in the case where an overcurrent, overvoltage or the like occurs in the energy storage device 14, the control panel 12 may determine that the emergency stop of the car 6 is necessary. For example, also in the case where the elevator has a problem, the control panel 12 may determine as needed that the emergency stop of the car 6 is necessary.

In the case where the emergency stop of the car 6 is not necessary in step S53, the control panel 12 performs the operation in step S54. In step S54, the control panel 12 causes the car 6 to travel to the nearest floor. Thereafter, the control panel 12 performs the operation in step S23 shown in FIG. 11.

In the case where the emergency stop of the car 6 is necessary in step S53, the control panel 12 performs the operation in step S55. In step S55, the control panel 12 makes the emergency stop of the car 6. Thereafter, the control panel 12 performs the operation in step S56. In step S56, the control panel 12 releases the autonomous mobile body 16 from the connection with the power supply device 21. Then, the control panel 12 performs the operation in step S57. In step S57, the control panel 12 determines whether or not the car 6 can travel with power of the energy storage device 14 from a viewpoint of both the elevator and the autonomous mobile body 16.

In the case where the car 6 can travel with power of the energy storage device 14 in step S57, a control device performs the operation in step S54. In the case where the car 6 cannot travel with power of the energy storage device 14 in step S57, the control device performs the operation in step S58. In step S58, the control panel 12 determines whether or not the car 6 can travel with power of the commercial power supply 24.

In the case where the car 6 cannot travel with power of the commercial power supply 24 in step S58, the control panel 12 performs the operation in step S23 shown in FIG. 11. In the case where the car 6 can travel with power of the commercial power supply 24 in step S58, the control panel 12 performs the operation in step S59.

In step S59, the control panel 12 assumes the occurrence of a locked-in state where users in the car 6 cannot get out of the car 6, and the control panel 12 requests a rescue.

Next, the description will be made, with reference to FIG. 14 and FIG. 15, with respect to the summary of the operations of the autonomous mobile body 16 and the control panel 12 when the elevator system supplies power to the autonomous mobile body 16.

FIG. 14 and FIG. 15 are flowcharts for describing the summary of the operations of the autonomous mobile body and the control panel when the elevator system of the embodiment 1 supplies power to the autonomous mobile body.

In step S61, the autonomous mobile body 16 requests the elevator by wireless communication to charge the autonomous mobile body 16. Thereafter, the operation in step S62 is performed.

In step S62, the control panel 12 determines whether or not power can be supplied. For example, in the case where there are many users in the car 6, the control panel 12 may determine that power cannot be supplied in the car 6.

In the case where power cannot be supplied in step S62, the operation in step S63 is performed. In step S63, the control panel 12 notifies the autonomous mobile body 16, by wireless communication, of rejection information which is obtained by combining information indicating that power cannot be supplied and information of the reason of the above.

Thereafter, the operation in step S64 is performed. In step S64, the autonomous mobile body 16 recognizes that charging cannot be performed. In the case where the cause of being unable to supply power is removed, the autonomous mobile body 16 requests the elevator by wireless communication again to charge the autonomous mobile body 16.

In the case where power can be supplied in step S62, the operation in step S65 is performed. In step S65, the control panel 12 receives respective information of the autonomous mobile body 16 by wireless communication.

Thereafter, the operation in step S66 is performed. In step S66, the control panel 12 determines, based on battery information or the like, whether or not power can be supplied to the autonomous mobile body 16.

In the case where power cannot be supplied to the autonomous mobile body 16 in step S66, the operation in step S63 is performed. In the case where power can be supplied to the autonomous mobile body 16 in step S66, the operation in step S67 is performed.

In step S67, the control panel 12 guides the autonomous mobile body 16 to the power supply device 21 when the autonomous mobile body 16 arrives in the vicinity of the power supply device 21. Thereafter, the operation in step S68 is performed. In step S68, the control panel 12 determines whether or not the normal connection is made between the elevator-side connector 23 and the mobile-body-side connector 20.

In the case where the normal connection is not made in step S68, the operation in step S69 is performed. In step S69, the control panel 12 guides the autonomous mobile body 16 to the power supply device 21 again. At this point of operation, guiding may be attempted plural times. Thereafter, the operation in step S70 is performed. In step S70, the control panel 12 determines whether or not the normal connection is made between the elevator-side connector 23 and the mobile-body-side connector 20.

In the case where the normal connection is not made in step S70, the operation in step S71 is performed. In step S71, the autonomous mobile body 16 is notified, by wireless communication, of rejection information which is obtained by combining information indicating that power cannot be supplied and information of the reason of the above.

Thereafter, the operation in step S72 is performed. In step S72, the control panel 12 commands the autonomous mobile body 16 to leave the power supply device 21.

Then, the operation in step S73 is performed. In step S73, the control panel 12 determines whether or not the autonomous mobile body 16 has left the power supply device 21.

In the case where the autonomous mobile body 16 has left the power supply device 21 in step S73, the operation in step S74 is performed. In step S74, the autonomous mobile body 16 recognizes that charging cannot be performed. In the case where the cause of being unable to supply power is removed, the autonomous mobile body 16 requests the elevator by wireless communication again to charge the autonomous mobile body 16.

In the case where the autonomous mobile body 16 does not leave the power supply device 21 in step S73, the operation in step S75 is performed. In step S75, the autonomous mobile body 16 issues an abnormality. At this point of operation, driving of the elevator is continued.

In the case where the normal connection is made in step S68 or step S70, the operation in step S76 is performed. In step S76, the control panel 12 maintains the normal connection. Thereafter, the operation in step S77 is performed.

In step S77, the control panel 12 determines, based on battery information or the like, whether or not power can be supplied to the autonomous mobile body 16. In the case where power cannot be supplied to the autonomous mobile body 16 in step S77, the operation in step S71 is performed. In the case where power can be supplied to the autonomous mobile body 16 in step S77, the operation in step S78 is performed.

In step S78, the control panel 12 drives the converter to supply power to the autonomous mobile body 16. Thereafter, the operation in step S79 is performed. In step S79, the control panel 12 determines whether or not the storage battery 16a or the like of the autonomous mobile body 16 has an abnormality.

In the case where there is an abnormality in step S79, the operation in step S71 is performed. In the case where there is no abnormality in step S79, the operation in step S80 is performed. In step S80, it is determined whether or not it is necessary to separate the power supply device 21 and the autonomous mobile body 16 from each other.

In the case where it is necessary to separate the power supply device 21 and the autonomous mobile body 16 from each other in step S80, the operation in step S71 is performed. In the case where it is not necessary to separate the power supply device 21 and the autonomous mobile body 16 from each other in step S80, the operation in step S81 is performed.

In step S81, the control panel 12 determines whether or not charging of the autonomous mobile body 16 is completed. In the case where charging of the autonomous mobile body 16 is not completed in step S81, the operation in step S78 is performed. In the case where charging of the autonomous mobile body 16 is completed in step S81, the operation in step S82 is performed.

In step S82, the control panel 12 notifies the autonomous mobile body 16 of information indicating the completion of charging. The control panel 12 stops the converter and, thereafter, releases the connection between the power supply device 21 and the autonomous mobile body 16.

Thereafter, the operation in step S83 is performed. In step S83, the control panel 12 commands the autonomous mobile body 16 to leave the power supply device 21. Then, the operation in step S84 is performed. In step S84, the control panel 12 determines whether or not the autonomous mobile body 16 has left the power supply device 21.

In the case where the autonomous mobile body 16 has left the power supply device 21 in step S84, the operation in step S85 is performed. In step S85, the autonomous mobile body 16 recognizes the completion of charging.

In the case where the autonomous mobile body 16 does not leave the power supply device 21 in step S84, the operation in step S75 is performed.

According to the embodiment 1 described above, in the case where a supply of power to the elevator is necessary, the autonomous mobile body 16 supplies power to the elevator. Therefore, power can be easily supplied to the elevator. As a result, a backup operation for the elevator can be performed even during power failure over a long period of time without causing the energy storage device 14 to have a large capacity.

Further, in the case where a supply of power to the autonomous mobile body 16 is necessary, the autonomous mobile body 16 is supplied with power from the elevator. Therefore, power can be easily supplied to the autonomous mobile body 16.

The autonomous mobile body 16 may be commanded to connect with a facility of a building, such as an illumination device or an air-conditioning device, or with a high level power supply facility, such as a cubicle, in order to supply power to the facility. In this case, power can be easily supplied to the facility.

A group management device which manages operations of a plurality of elevators or a supervision device which manages a plurality of equipment in a building may be used as a coordinating device, and command information may be sent from the coordinating device to the autonomous mobile body 16. Also in this case, power can be easily supplied to the elevator.

Positional information in supplying power may be sent to the autonomous mobile body 16 based on map information registered in advance. In this case, the autonomous mobile body 16 can be guided to an appropriate position with certainty.

When the commercial power supply 24 is cut off, it is sufficient to command the autonomous mobile body 16 to supply power to the elevator using power of the energy storage device 14. In this case, power can be supplied to the elevator with more certainty.

In the case where the supply of power to the autonomous mobile body 16 is necessary, it is sufficient for the autonomous mobile body 16 to be supplied with power from the commercial power supply 24 or with regenerative power of the elevator. In this case, power can be supplied to the autonomous mobile body 16 with more certainty.

Power is transmitted and received via the power supply device 21. The power supply device 21 includes the elevator-side connector 23. Therefore, power and information are transmitted and received through wiring. Accordingly, it is possible to increase the reliability in transmission and reception of power and information.

Sensors are provided as alignment devices. Therefore, the autonomous mobile body 16 can be guided to the power supply device 21 with certainty. At this point of operation, cameras, optical sensors, acoustic wave sensors, position sensors or the like may be applied as the alignment devices.

There may be also a case where the power supply device 21 transmits or receives power to or from the plurality of autonomous mobile bodies 16 simultaneously. In this case, the power supply device 21 may increase the amount of power to be transmitted or received.

The transmission and reception of power is suitably set according to the specification of the elevator and the autonomous mobile body 16. In the embodiment 1, the DC/DC converter 12b converts and supplies DC power from the autonomous mobile body 16 to the elevator, and converts and supplies DC power from the elevator to the autonomous mobile body 16.

The transmission and reception of power is controlled based on information, such as a rated voltage, a rated current, and the amount of usable power, from the autonomous mobile body 16. Therefore, power can be transmitted and received under more appropriate conditions.

An elevator which transmits or receives power to or from the autonomous mobile body 16 is selected from a plurality of elevators. Therefore, power can be transmitted and received under more appropriate conditions.

Next, an example of the control panel 12 will be described with reference to FIG. 16.

Figure 16:
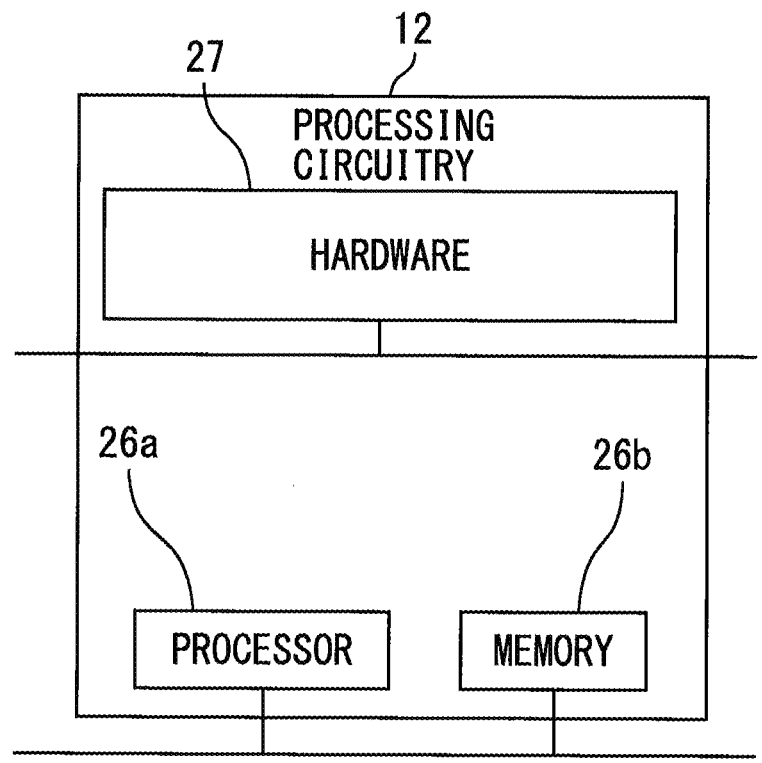
FIG. 16 is a configuration diagram of hardware of the control panel of the elevator system of the embodiment 1.

FIG. 16 is a configuration diagram of hardware of the control panel of the elevator system of the embodiment 1.

The respective functions of the control panel 12 can be achieved by a processing circuitry. For example, the processing circuitry may include at least one processor 26a and at least one memory 26b. For example, the processing circuitry may include at least one dedicated hardware 27.

In the case where the processing circuitry includes at least one processor 26a and at least one memory 26b, the respective functions of the control panel 12 is achieved by software, firmware, or a combination of the software and the firmware. At least one of the software and the firmware is referred to as a program. At least one of the software and the firmware is stored in at least one memory 26b. At least one processor 26a reads and executes the program stored in at least one memory 26b to achieve the respective functions of the control panel 12. At least one processor 26a is also referred to as a central processing unit, a processing unit, an arithmetic unit, a microprocessor, a microcomputer, or a DSP. For example, at least one memory 26b may be a nonvolatile or volatile semiconductor memory, such as a RAM, a ROM, a flash memory, an EPROM, or an EEPROM, a magnetic disk, a flexible disk, an optical disc, a compact disc, a minidisc, a DVD or the like.

In the case where the processing circuitry includes at least one dedicated hardware 27, the processing circuitry may be achieved by, for example, a single circuitry, a composite circuitry, a programmed processor, a parallel programmed processor, an ASIC, an FPGA, or a combination of the above. For example, the respective functions of the control panel 12 may be respectively achieved by the processing circuitries. For example, the respective functions of the control panel 12 may be collectively achieved by the processing circuitry.

Some of the respective functions of the control panel 12 may be achieved by the dedicated hardware 27, and other functions may be achieved by the software or the firmware. For example, the function of the control unit 12d may be achieved by the processing circuitry formed of the dedicated hardware 27, and functions other than the function of the control unit 12d may be achieved by at least one processor 26a reading and executing the program stored in at least one memory 26b.

As described above, the processing circuitry achieves the respective functions of the control panel 12 by the hardware 27, the software, the firmware, or a combination of the software and the firmware.

Although not shown in the drawing, respective functions of the monitoring device 13 are also achieved by a processing circuitry equivalent to the processing circuitry which achieves the respective functions of the control panel 12. The respective functions of the information center device 15 are also achieved by a processing circuitry equivalent to the processing circuitry which achieves the respective functions of the control panel 12.

Embodiment 2

Figure 17:
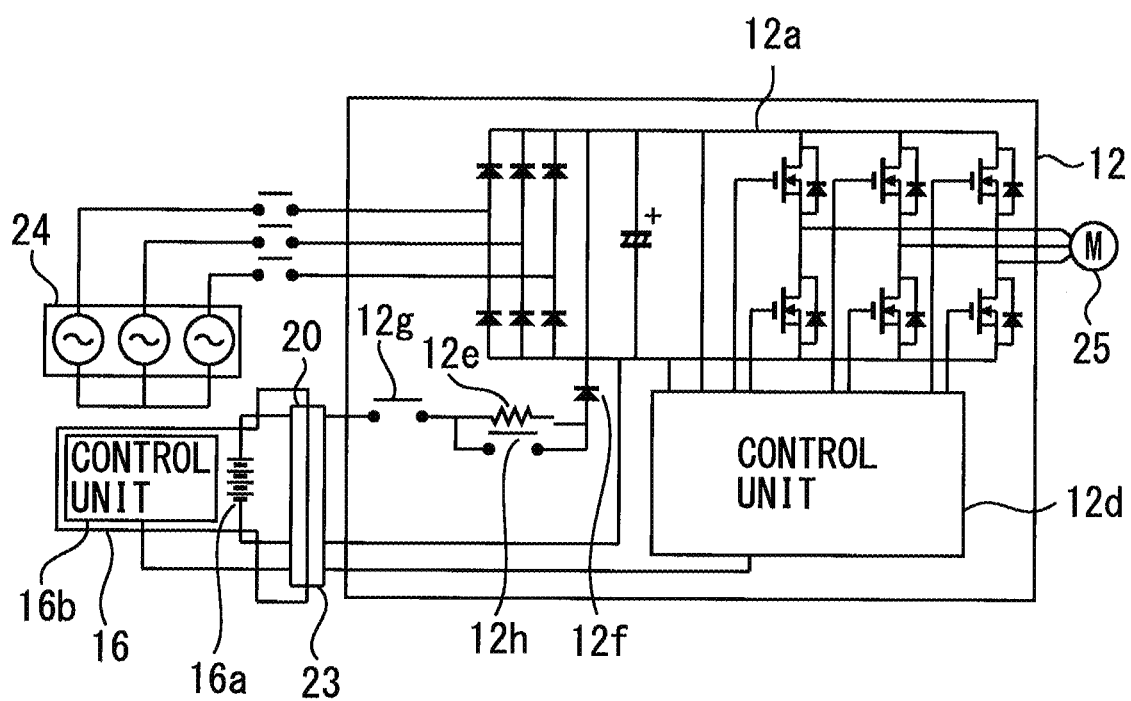
FIG. 17 is a circuitry diagram for describing transmission and reception of power between an elevator system of an embodiment 2 and the autonomous mobile body.

FIG. 17 is a circuitry diagram for describing transmission and reception of power between an elevator system of an embodiment 2 and the autonomous mobile body. Components identical or corresponding to the components in the embodiment 1 are given the same reference symbols. The description of such components will be omitted.

The control panel 12 in the embodiment 2 does not include the DC/DC converter 12b. The control panel 12 in the embodiment 2 includes a resistance 12e, a diode 12f, a first contactor 12g, and a second contactor 12h.

The resistance 12e is provided such that the resistance 12e can suppress an inrush current at the time when the mobile-body-side connector 20 and the elevator-side connector 23 are connected with each other.

The diode 12f is provided such that the diode 12f can make a DC voltage from the storage battery 16a constant, and can supply the DC voltage to the DC link of the power converter 12a.

In the case where the elevator system is supplied with DC power from the autonomous mobile body 16, when a supply of DC power is confirmed by communication or the like at the time of connection between the mobile-body-side connector 20 and the elevator-side connector 23, the control unit 12d turns on the first contactor 12g. Thereafter, when the potential of the DC voltage of the DC link of the power converter 12a becomes the same as the potential of the DC voltage of the storage battery 16a, the control unit 12d turns on the second contactor 12h.

According to the embodiment 2 described above, the control panel 12 does not include the DC/DC converter 12b. Therefore, power can be easily supplied to the elevator with a simple configuration.

In the embodiment 2, the control unit 12d is not supplied with power from the storage battery 16a.

Embodiment 3

Figure 18:
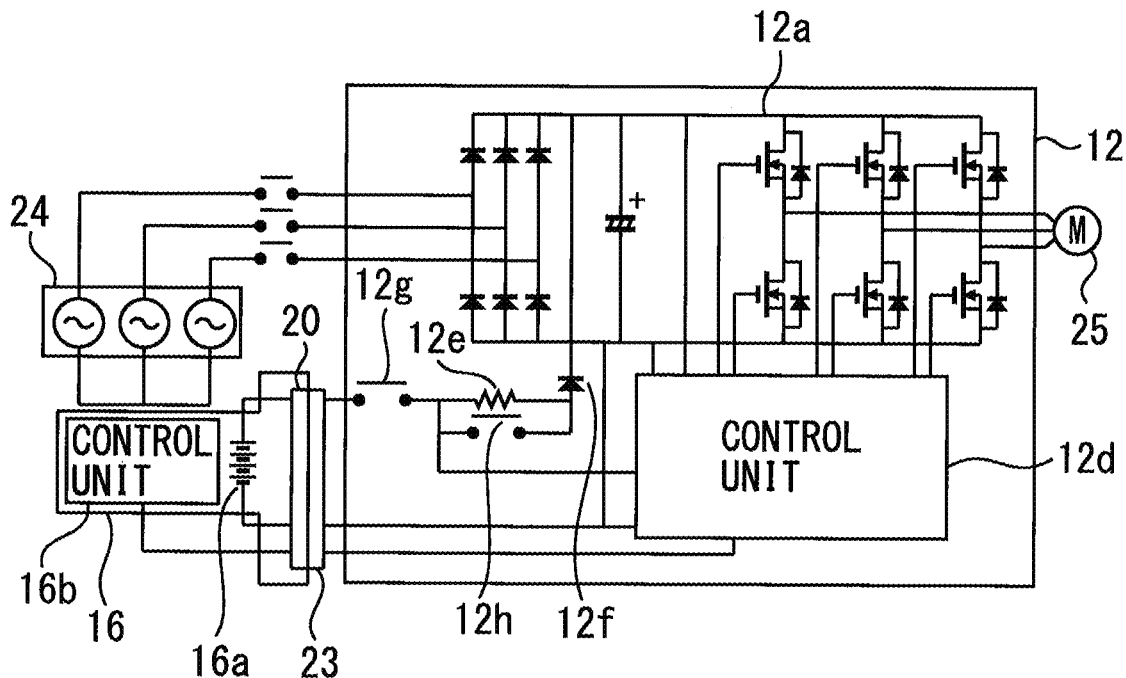
FIG. 18 is a circuitry diagram for describing transmission and reception of power between an elevator system of an embodiment 3 and the autonomous mobile body.

FIG. 18 is a circuitry diagram for describing transmission and reception of power between an elevator system of an embodiment 3 and the autonomous mobile body. Components identical or corresponding to the components in the embodiment 2 are given the same reference symbols. The description of such components will be omitted.

The control unit 12d in the embodiment 3 is supplied with DC power from the storage battery 16a. For example, the control unit 12d may receive a DC voltage from the storage battery 16a directly without the DC voltage being converted. For example, the control unit 12d may receive a DC voltage from the storage battery 16a after the DC voltage is converted by a converter not shown in the drawing.

According to the embodiment 3 described above, the control unit 12d is supplied with DC power from the storage battery 16a. Therefore, a backup operation for the elevator can be performed with more certainty even during power failure over a long period of time.

Embodiment 4

Figure 19:
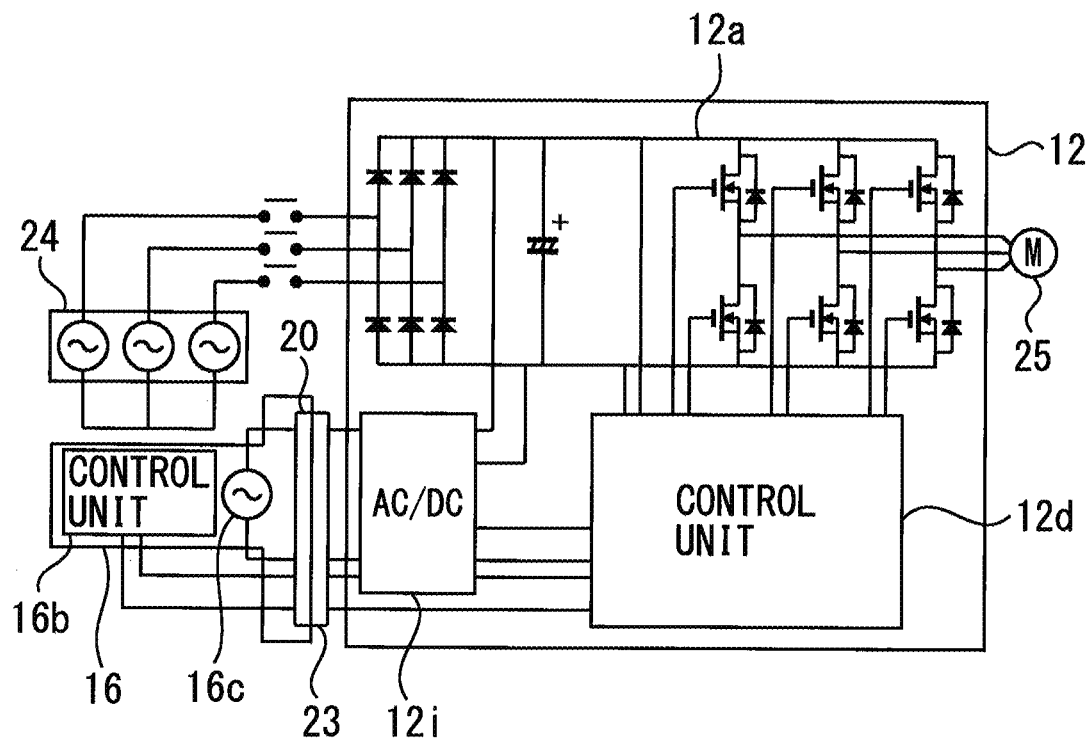
FIG. 19 is a circuitry diagram for describing transmission and reception of power between an elevator system of an embodiment 4 and the autonomous mobile body.

FIG. 19 is a circuitry diagram for describing transmission and reception of power between an elevator system of an embodiment 4 and the autonomous mobile body. Components identical or corresponding to the components in the embodiment 1 are given the same reference symbols. The description of such components will be omitted.

The control panel 12 in the embodiment 4 does not include the DC/DC converter 12b. The control panel 12 in the embodiment 4 includes an AC/DC converter 12i.

The autonomous mobile body 16 in the embodiment 4 does not include the storage battery 16a. The autonomous mobile body 16 in the embodiment 4 includes an AC input/output device 16c. For example, the AC input/output device 16c may be provided such that the AC input/output device 16c can be supplied with AC power from an outlet not shown in the drawing.

When the elevator system is supplied with AC power from the autonomous mobile body 16, the AC/DC converter 12i converts the AC voltage of the AC input/output device 16c to a desired DC voltage. The AC/DC converter 12i supplies, to the control unit 12d, a DC voltage matched to the control unit 12d. The AC/DC converter 12i supplies, to the DC link of the power converter 12a, a DC voltage matched to the DC link of the power converter 12a.

According to the embodiment 4 described above, in the same manner as the embodiment 1, a backup operation for the elevator can be performed even during power failure over a long period of time.

Embodiment 5

Figure 20:
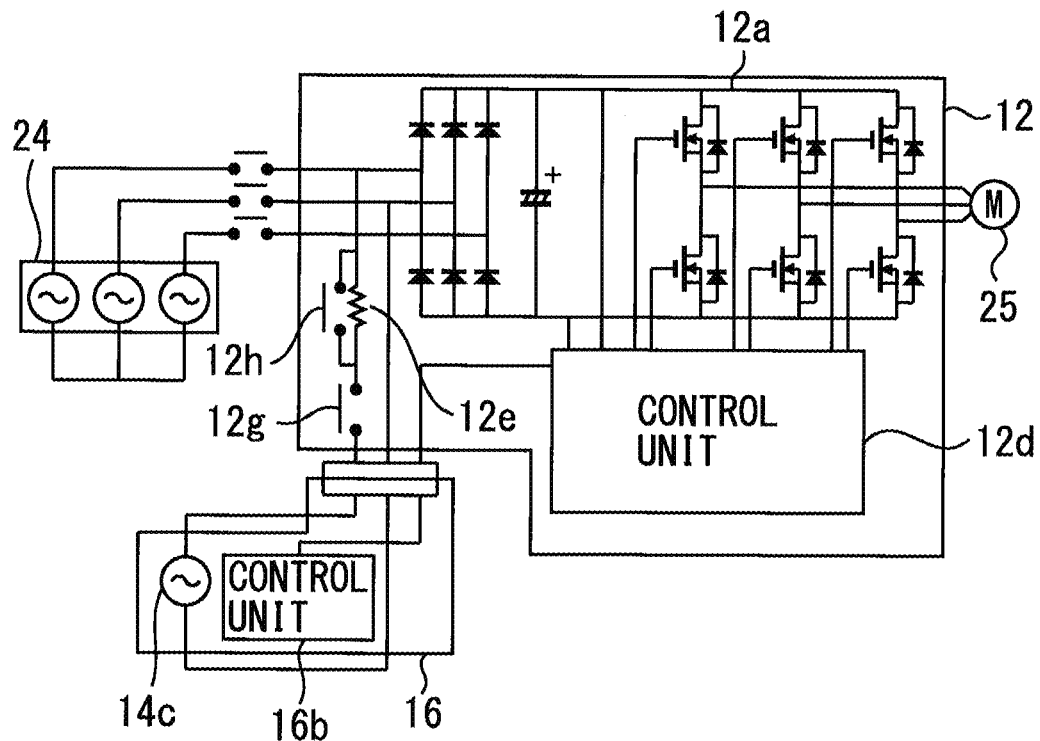
FIG. 20 is a circuitry diagram for describing transmission and reception of power between an elevator system of an embodiment 5 and the autonomous mobile body.

FIG. 20 is a circuitry diagram for describing transmission and reception of power between an elevator system of an embodiment 5 and the autonomous mobile body. Components identical or corresponding to the components in the embodiment 2 or the embodiment 4 are given the same reference symbols. The description of such components will be omitted.

The control panel 12 in the embodiment 5 does not include the AC/DC converter 12i. In the same manner as the control panel 12 in the embodiment 2, the control panel 12 in the embodiment 5 includes the resistance 12e, the first contactor 12g, and the second contactor 12h. The control panel 12 in the embodiment 5 does not include the diode 12f.

In the case where the power converter 12a is supplied with AC power from the autonomous mobile body 16, when a supply of AC power is confirmed by communication or the like at the time of connection between the mobile-body-side connector 20 and the elevator-side connector 23, the control unit 12d turns on the first contactor 12g. Thereafter, when the potential of the DC voltage of the DC link of the power converter 12a becomes a potential set in advance, the control unit 12d turns on the second contactor 12h.

According to the embodiment 5 described above, in the same manner as the embodiment 2, power can be easily supplied to the elevator with a simple configuration.

In the embodiment 5, a DC input/output device may be provided in place of the AC input/output device 16c.

Embodiment 6

Figure 21:
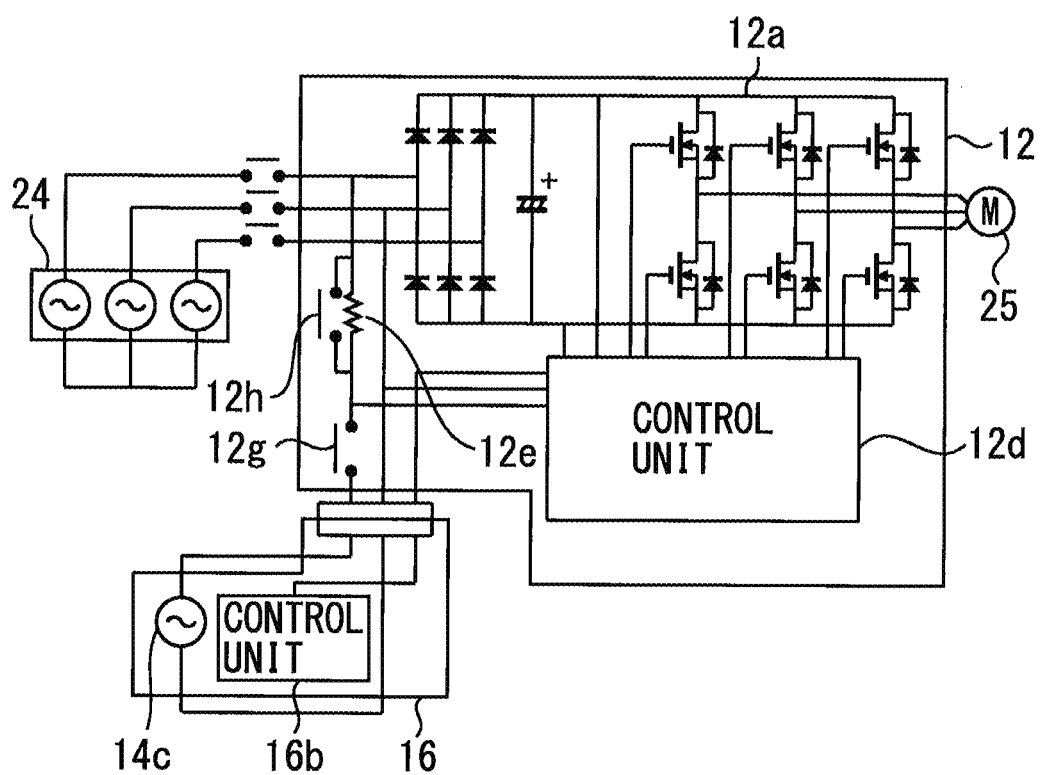
FIG. 21 is a circuitry diagram for describing transmission and reception of power between an elevator system of an embodiment 6 and the autonomous mobile body.

FIG. 21 is a circuitry diagram for describing transmission and reception of power between an elevator system of an embodiment 6 and the autonomous mobile body. Components identical or corresponding to the components in the embodiment 5 are given the same reference symbols. The description of such components will be omitted.

The control unit 12d in the embodiment 6 is supplied with AC power from the AC input/output device 16c. The control unit 12d in the embodiment 6 receives an AC voltage from the AC input/output device 16c after the AC voltage is converted to a DC voltage by a converter not shown in the drawing.

According to the embodiment 6 described above, in the same manner as the embodiment 3, a backup operation for the elevator can be performed with more certainty even during power failure over a long period of time.

In the embodiment 6, a DC input/output device may be provided in place of the AC input/output device 16c.

Embodiment 7

Figure 22:
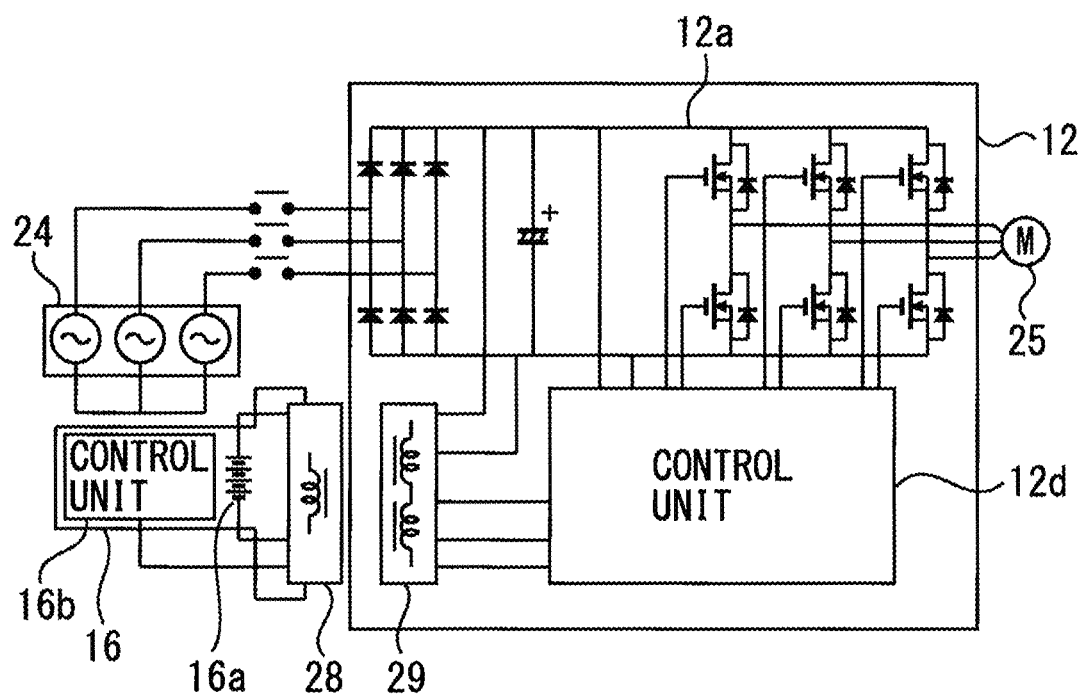
FIG. 22 is a circuitry diagram for describing transmission and reception of power between an elevator system of an embodiment 7 and the autonomous mobile body.

FIG. 22 is a circuitry diagram for describing transmission and reception of power between an elevator system of an embodiment 7 and the autonomous mobile body. Components identical or corresponding to the components in the embodiment 1 are given the same reference symbols. The description of such components will be omitted.

In the embodiment 7, a mobile-body-side wireless power feeding device 28 is provided in place of the mobile-body-side connector 20. An elevator-side wireless power feeding device 29 is provided in place of the elevator-side connector 23.

In the embodiment 7, the control unit 12d and the control unit 16b are provided such that the control unit 12d and the control unit 16b can perform wireless communication.

According to the embodiment 7 described above, power is transmitted and received via the mobile-body-side wireless power feeding device 28 and the elevator-side wireless power feeding device 29. In this case, power can be transmitted and received without requiring a mechanical connection with the autonomous mobile body 16.

In the case of wireless power feeding, it is sufficient to determine whether or not the mobile-body-side wireless power feeding device 28 is disposed to face the elevator-side wireless power feeding device 29 at a specific position and at a specific angle when transmission and reception of power starts.

In the embodiment 1 to the embodiment 6, wireless communication may be performed between the control unit 12d and the control unit 16b.

In the case where wireless communication is not appropriately performed between the control unit 12d and the control unit 16b due to the influence of noise or the like, it is sufficient to attempt the establishment of wireless communication between the control unit 12d and the control unit 16b again. In this case, as a result, it is possible to increase an opportunity of transmission and reception of power between the elevator system and the autonomous mobile body 16.

INDUSTRIAL APPLICABILITY

As has been described above, the elevator system according to this invention can be used for a system which coordinates with the autonomous mobile body.

REFERENCE SIGNS LIST 1 hoistway, 2 machine room, 3 hall, 4 traction machine, 5 main rope, 6 car, 7 counter weight, 8 hatch door, 9 hall operating panel, 10 car door, 11 car operating panel, 12 control panel, 12a power converter, 12b DC/DC converter, 12c voltmeter, 12d control unit, 12e resistance, 12f diode, 12g first contactor, 12h second contactor, 12i AC/DC converter, 13 monitoring device, 14 energy storage device, 15 information center device, 16 autonomous mobile body, 16a storage battery, 16b control unit, 16c AC input/output device, 17 elevator-side communication device, 18 mobile-body-side communication device, 19 mobile-body-side sensor, 20 mobile-body-side connector, 20a mobile-body-side power supply part, 20b mobile-body-side signal part, 21 power supply device, 22 elevator-side sensor, 23 elevator-side connector, 23a elevator-side power supply part, 23b elevator-side signal part, 24 commercial power supply, 25 motor, 26a processor, 26b memory, 27 hardware, 28 mobile-body-side wireless power feeding device, 29 elevator-side wireless power feeding device

The invention claimed is:

1. An elevator system comprising:
coordinating circuitry configured to command an autonomous mobile electronic machine configured to move inside a building to supply power to an elevator which is operated with commercial power from a commercial power supply, when the commercial power is cut off from being supplied to the building.

2. The elevator system according to claim 1, wherein in a case where the coordinating circuitry determines that a supply of power to the autonomous mobile electronic machine is necessary, the coordinating circuitry commands the autonomous mobile electronic machine to be supplied with power from the elevator.

3. The elevator system according to claim 1, wherein the coordinating circuitry commands the autonomous mobile electronic machine to connect with a facility of the building or with a high level power supply facility in order to supply power to the facility.

4. The elevator system according to claim 1, wherein the coordinating circuitry is group management circuitry configured to manage operations of a plurality of elevators, including the elevator, or is a supervision device in which the elevator manages a plurality of equipment in the building.

5. The elevator system according to claim 1, wherein the coordinating circuitry sends, to the autonomous mobile electronic machine, positional information in supplying power based on map information registered in advance.

6. The elevator system according to claim 1, further comprising an energy storage device configured to store power, wherein
in a case where the commercial power to the elevator is cut off, the coordinating circuitry commands the autonomous mobile electronic machine to supply power to the elevator using power of the energy storage device.

7. The elevator system according to claim 1, wherein in a case where the coordinating circuitry determines that the supply of power to the autonomous mobile electronic machine is necessary, the coordinating circuitry commands the autonomous mobile electronic machine to be supplied with power from the commercial power supply which supplies the commercial power to the elevator or with regenerative power of the elevator.

8. The elevator system according to claim 1, further comprising power supply circuitry in at least one of a machine room associated with the elevator, a hall, and/or a car of the elevator, wherein
in a case where the coordinating circuitry determines that transmission and reception of power between the elevator and the autonomous mobile electronic machine is necessary, the coordinating circuitry commands the autonomous mobile electronic machine to transmit or receive power via the power supply circuitry.

9. The elevator system according to claim 8, wherein the power supply circuitry includes an elevator-side connector to be mechanically and electrically connected with a mobile-body-side connector of the autonomous mobile electronic machine.

10. The elevator system according to claim 8, wherein the power supply circuitry includes wireless power feeding circuitry configured to transmit or receive power to or from the autonomous mobile electronic machine without being mechanically connected with the autonomous mobile electronic machine.

11. The elevator system according to claim 8, further comprising an alignment aligner configured to perform alignment between the power supply circuitry and the autonomous mobile electronic machine.

12. The elevator system according to claim 8, wherein the power supply circuitry transmits or receives power to or from a plurality of autonomous mobile electronic machines, including the autonomous mobile electronic machine, simultaneously.

13. The elevator system according to claim 8, further comprising an AC/DC converter configured to convert AC power from the autonomous mobile electronic machine to DC power, and to supply the DC power to the elevator, and configured to convert DC power from the elevator to AC power, and to supply the AC power to the autonomous mobile electronic machine.

14. The elevator system according to claim 8, further comprising a DC/DC converter configured to convert DC power from the autonomous mobile electronic machine to DC power matched to the elevator, and to supply the DC power to the elevator, and configured to convert DC power from the elevator to DC power matched to the autonomous mobile electronic machine, and to supply the DC power to the autonomous mobile electronic machine.

15. The elevator system according to claim 14, wherein the coordinating circuitry commands the DC/DC converter to transmit or receive power to or from the autonomous mobile electronic machine via the power supply circuitry after a voltage of DC link of the elevator is matched to a DC voltage of the autonomous mobile electronic machine.

16. The elevator system according to claim 1, wherein the coordinating circuitry receives information on a rated voltage, a rated current, and/or an amount of usable power from the autonomous mobile electronic machine to control transmission and reception of power based on the information.

17. The elevator system according to claim 1, wherein the coordinating circuitry selects, from a plurality of elevators, including the elevator, one of the elevators which transmits or receives power to or from the autonomous mobile electronic machine.

18. A coordinating device comprising:
circuitry configured to command an autonomous mobile electronic machine configured to move inside a building to supply power to a facility of the building in response to commercial power from a commercial power supply being cut off from being supplied to an elevator of the building.

* * * * *